United States Patent [19]

McKechnie et al.

[11] Patent Number: 4,864,390
[45] Date of Patent: Sep. 5, 1989

[54] DISPLAY SYSTEM WITH EQUAL PATH LENGTHS

[75] Inventors: Thomas S. McKechnie, Ossining; Jill F. Goldenberg, Pelham Manor; Joshua D. Eskin, New York; Jeffrey A. Shimizu, Mt. Kisco, all of N.Y.; Ralph H. Bradley, Jr.; William F. Guerinot, both of Knoxville, Tenn.

[73] Assignee: North American Philips Corporation, New York, N.Y.

[21] Appl. No.: 292,618

[22] Filed: Dec. 29, 1988

Related U.S. Application Data

[63] Continuation of Ser. No. 899,469, Aug. 22, 1986, abandoned.

[51] Int. Cl.$^4$ .................... H04N 9/30; H04N 9/31
[52] U.S. Cl. ............................ 358/60; 358/61; 340/784; 350/345; 353/34
[58] Field of Search ............ 358/61, 62, 232, 233, 358/236; 340/784, 330; 350/337, 338, 345, 347 E, 400, 401, 403, 408; 353/31, 34

[56] References Cited

U.S. PATENT DOCUMENTS

| | | | |
|---|---|---|---|
| 4,127,322 | 11/1978 | Jacobson et al. | 353/31 |
| 4,191,456 | 3/1980 | Hong et al. | 358/61 |
| 4,305,099 | 12/1981 | True et al. | 358/60 |
| 4,425,028 | 1/1984 | Gagnon et al. | 350/337 |
| 4,435,732 | 3/1984 | Hyatt | 358/254 |
| 4,461,542 | 7/1984 | Gagnon | 353/31 |
| 4,464,019 | 8/1984 | Gagnon | 350/331 R |
| 4,544,237 | 10/1985 | Gagnon | 350/331 R |
| 4,562,478 | 12/1985 | Hirasawa et al. | 358/236 |
| 4,642,740 | 2/1987 | True | 358/233 |
| 4,739,396 | 4/1988 | Hyatt | 358/60 |

*Primary Examiner*—James J. Groody
*Assistant Examiner*—Robert M. Bauer
*Attorney, Agent, or Firm*—Paul R. Miller

[57] ABSTRACT

Display systems useful for projection video and television systems are provided to perform with high efficiency and good color rendition. In these systems, color may be provided, as one example, by various light valves, such as liquid crystal displays. Each of the liquid crystal displays are positioned at equal path distances from an illuminating subsystem, and have equal path distances from the light valves to a projection subsystem. This enables optimum illumination of each of the light valves. Various embodiments of arranging the light valves, as well as providing illumination are described.

82 Claims, 19 Drawing Sheets

- NTSC STANDARDS
- X TWO DICHROIC FILTERS WITH CUTOFFS AT $\lambda_1 = 505$ nm, $\lambda_2 = 580$ nm

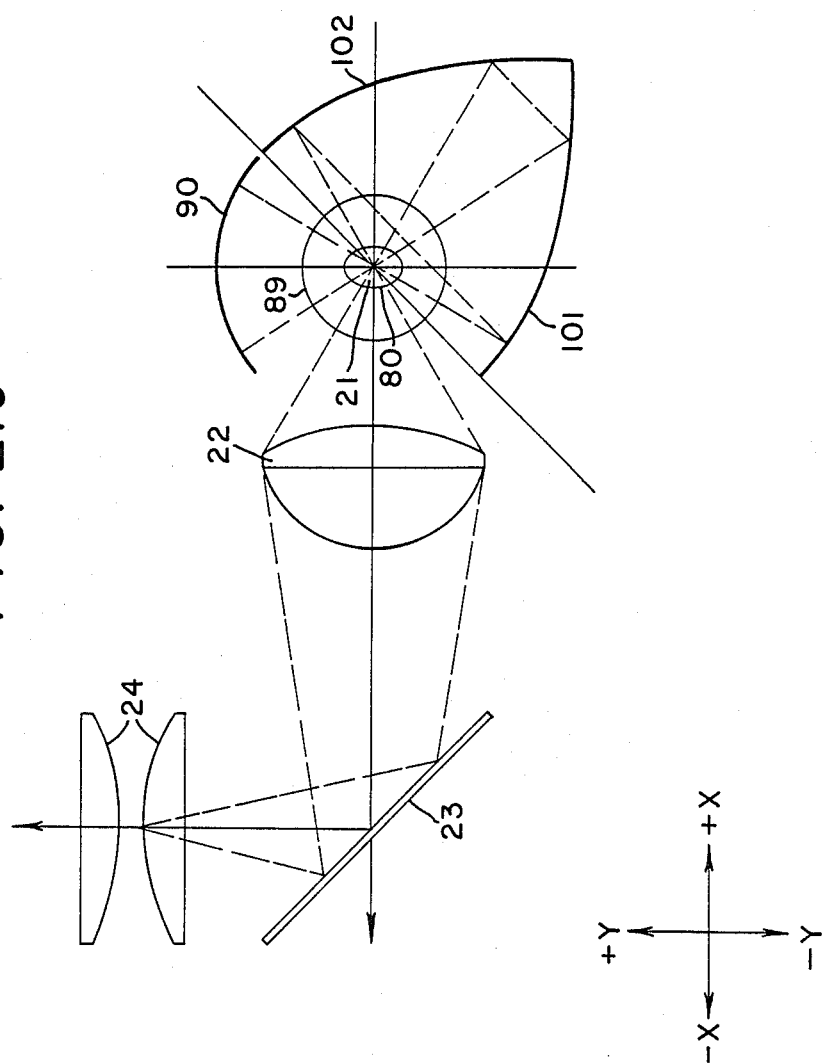

DISPLAY SYSTEM WITH EQUAL PATH LENGTHS

This is a continuation of application Ser. No. 899,469, filed Aug. 22, 1986, now abandoned.

The present invention is directed to the optical arrangement for a display system which performs with high efficiency and good color rendition. In particular, the use of transmission light valve display systems of types such as liquid crystal displays (LCDs) including tunable birefringent light valves (TBLV), etc. are described in a manner to vastly improve displays for use in projection video and television systems, for example.

BACKGROUND OF THE INVENTION

Liquid crystal type displays (LCDs) have recently been studied for use in television systems. Use of liquid crystals in television receivers may be seen in U.S. Pat. No. 4,562,478. This prior device uses back lighting to illuminate a liquid crystal display so that images can be displayed in dark places. The system is small but contemplates black and white TV images although colored back lighting panels are suggested.

The use of liquid crystal configurations for projection television systems has also been considered in the manner shown by Seiko Epson Corp. in ELECTRONICS at page 47 on May 12, 1986. Such prior projection television scheme is illustrated in FIG. 1 of the present application. In this arrangement, light from a tungsten halogen lamp 1 is variously transmitted and reflected through a crossed pair of dichroic mirrors 2 and adjacent mirrors 3 to pass through three liquid crystal displays 4, 5 and 6. These three LCDs modulate three channels to create the red, green, and blue portions of a TV picture. The dichroic mirrors 2 break the white light source 1 into red, blue, and green portions of the spectrum. These three color portions are then recombined by way of a dichroic prism 7. The recombined light is projected by way of a projection lens 8 to a projection screen 9.

In this prior system, the source 1 of light is a tungsten halogen lamp having a small source size which is desirable for high collection efficiency. Since such lamps are deficient in the blue portion of the spectrum, they yield poor color quality.

This arrangement of the prior art in FIG. 1 also includes a condenser arrangement consisting of a condenser lens 10 and reflector 11. The condenser lens 10 is designed for maximum collection efficiency to collect light emitted in the $+X$ direction. The spherical reflector 11 collects light emitted in the $-X$ direction and images the light of the lamp back onto itself.

The difficulty with the prior art systems is that light is lost because the illumination system provides only optimum illumination across the green LCD. Since the red and blue LCDs are farther from the source, they are overfilled with the respective illumination, and light of the respective wavelengths is thus lost. Moreover, owing to its complexity and size, the dichroic prism 7 is expensive.

SUMMARY OF THE INVENTION

The present invention provides a significant improvement in display systems, particularly useful for projection video and television systems, by way of arranging the optical system so that each light valve is at the same distance from the light source, and also that each light valve is at the same distance to the projection lens system. This significantly improves color efficiency and rendition for a projection TV system.

These types of display systems of the present invention contain two or more modulators which are otherwise called light valves. Such modulators or light valves have the property that they can be modulated as pixels by applying voltages or currents to appropriate buses. When these modulators are illuminated from one side with light and are imaged by projection lenses onto a front or rear projection screen, e.g. a white wall, the display can be viewed. If the light valve has a grey scale characteristic, i.e. the transmission is appropriately proportional to some function of the applied signal the display can reproduce grey scales. Some displays are used for graphics or data display and need only to have a property of being switched between a transmissive state and an opaque state. Some displays are updated only occasionally and do not have to have fast switching speed. Others are used to display video such as is used in NTSC television transmission, and switching speeds need to be at video rates. The resolution of displayed images will be limited by the number of pixels used in the modulator if the projection optics is of sufficient quality and the registration of respective images of modulators for different light paths is accurate. The present invention sets forth improvements in the way that such light valves may be utilized to obtain display devices.

For purposes of clarification, two principles for producing a light valve are briefly noted. They include the discussion by Leo Levi in Applied Optics, Vol. 2, published by John Wiley and Sons in 1980 at page 324, that a negative anisotropic liquid crystal which is normally transparent will become opaque when currents induced by an applied voltage are applied. Turbulence in the structure caused by the currents cause the crystal to become strongly scattering. A light valve based on this principle does not require either polarized light or a polarizer as part of the constructed light valve cell. Such a light valve is illustrative of any type of modulator which does not require incident light to be polarized or use a polarizer. Another type of liquid crystal light valve, sometimes called a transmissive liquid crystal display, either uses a polarizer and also an analyzer in its construction or depends on the illuminating light being polarized. This type of light valve uses the principle, as also described by Levi at page 322, of modulating light by utilizing tunable bifringence. The degree of birefringence of a pixel is controlled by the amount of voltage applied across each pixel. The latter type of light valve has recently become a subject of considerable attention because large contrast ratios have been demonstrated; and they can operate at video rates and be relatively insensitive to the wavelength of incident light. Light valves utilizing tunable birefringence are denoted as TBLV in this application.

A disadvantage of TBLVs is that ordinarily half of the light is automatically lost when the illuminating rays pass through the polarizer. Liquid crystal TBLVs, which are being commercially produced by several companies, are available in several variations. For the purpose of the present invention, some embodiments are particularly designed for light valves in which efficiency would be enhanced if the illuminating light were polarized. Otherwise, the embodiments are appropriate for any type of transmissive modulating light valve.

Considerations governing the selection of light valves are cost, number of pixels, size of pixels, contrast ratio, efficiency, reliability, and signal and power requirements. Another important concept is the mode of applying the signal to the pixels. Ideally, each pixel should remain set at a particular transmission state until it is updated on the next scan. This would assure efficient utilization of the light energy which illuminates the modulating light valve. Active matrix tunable birefringent liquid crystal light valves have this property and provide further reasons for the strong present interest in such devices.

The significant advantages of the present invention may be applied to various types of transmission light valves, including LCD transmission type light valves, and may be further enhanced by variations in the optical system, variations in the illumination system, variations in light source and color separation techniques and variations in schemes to increase brightness. These different advantageous arrangements may be seen by way of the following description of the present invention.

BRIEF DESCRIPTION OF THE DRAWINGS

The structure and arrangements of the new display system, for example, of the present invention can be seen without limitation in the attached drawing figures, in which.

DESCRIPTION OF PREFERRED EMBODIMENTS

Figure 2:
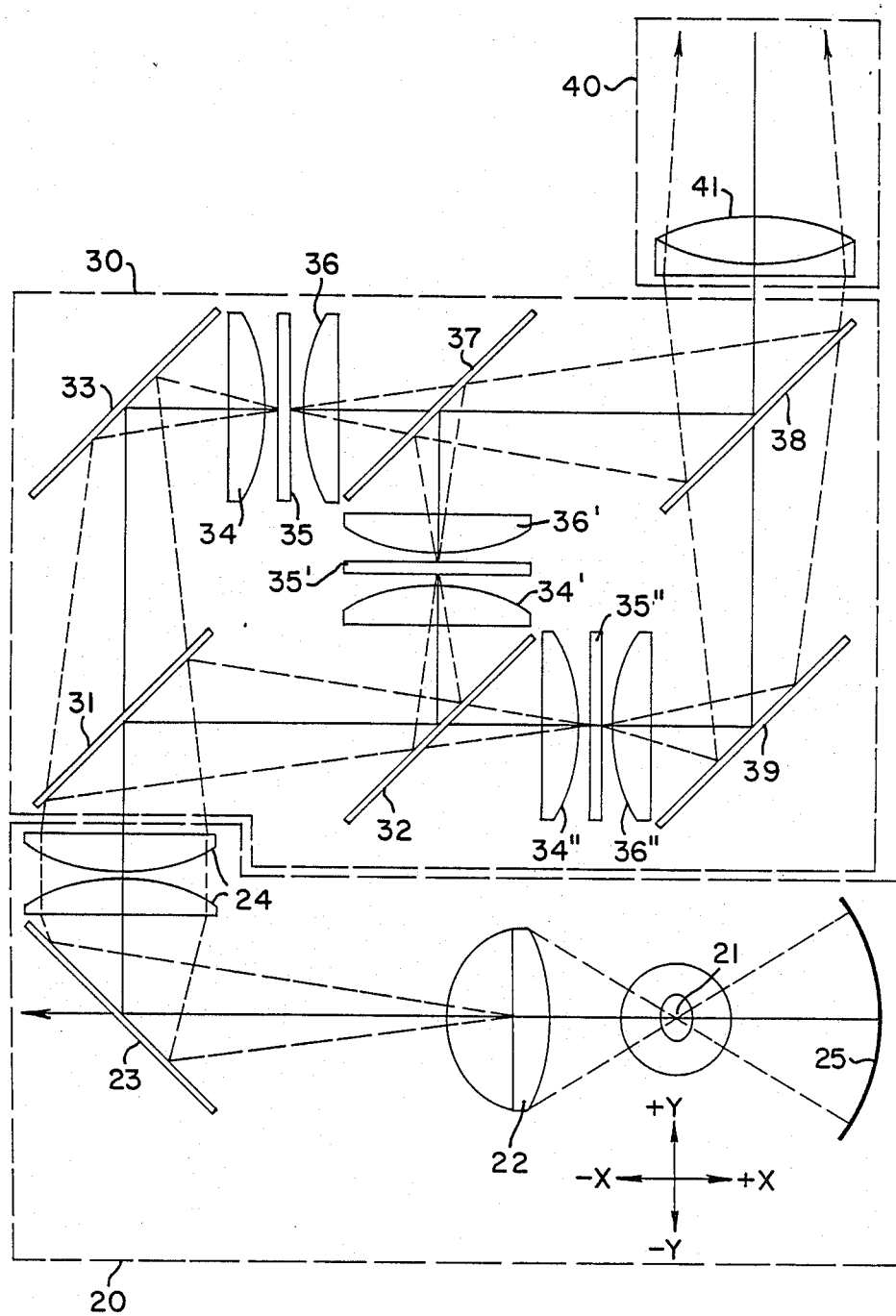

The display system according to the present invention may be seen schematically by reference to FIG. 2 in which an illumination subsystem 20, a modulation subsystem 30 and a projection subsystem 40 are combined to form a light valve projection display system. The illumination subsystem includes a lamp 21 providing a light source and a condenser lens system 22 projecting the light source to a cold mirror 23 (which reflects visible wavelengths and transmits infrared radiation) for reflection of the light through a substage condenser 24 in the illumination subsystem. The light from the lamp 21 may be reflected from a reflector 25 in order to enhance the amount of light being projected.

The projection subsystem 40 includes a projection lens system 41. Such a lens system 41 may include multiple sets of lenses capable of projecting light, as will be further discussed.

The modulation subsystem 30 receives light from the illumination subsystem 20 through the substage condenser 24. The light is projected to a green and blue reflecting dichroic filter 31 in which green and blue light are reflected to a further reflecting dichroic filter 32, while red light is projected through the filter 31 to a front surface mirror 33. The light reflected by the front surface mirror 33 is passed through an illumination side field lens 34, a red channel liquid crystal display 35, a projecting side field lens 36 and a green reflecting dichroic filter 37 to a red and green reflecting dichroic filter 38 where it is reflected to the projection subsystem 40.

The blue and green light reflected from the filter 31 passes to the green reflecting filter 32. Green light is reflected to pass through the illumination side field lens 34', the green channel liquid crystal display 35', and projection side field lens 36' and is reflected by the reflective side of the filter 37. Green components of light are passed along with the red components of light to the red and green reflecting filter 38. Blue light passing through the filter 32 is directed through the illumination side field lens 34", the blue channel liquid crystal display 35", and the projection side field lens 36" to the front surface mirror 39. The blue component of light reflected at the front surface mirror 39 is passed through the red and green reflecting filter 38 to the projection subsystem 40. In fact, light of all three components (red, green, and blue) is then projected by the projection subsystem 40 to a projection screen.

Thus, white light is separated by way of the color separation filters 31 and 32 into three color channels (red, green, and blue). An addressable light valve, e.g. liquid crystal display 35, 35', and 35" is placed in each channel to modulate the three color light beams with electrical TV signals. The color filters 37 and 38 recombine the three color channels into a single beam which is projected onto the projection screen. The projection lens subsystem 40 magnifies and projects the images formed by the three LCDs onto the projection screen. Such an optical system layout is appropriate for either front or rear projection systems.

A modulation subsystem is thus provided which can be used with any type of viewing apparatus. Color can also be modulated for use in electrical graphical displays, display devices, and video and television systems.

An important aspect of the projection display according to the present invention is that the light from the light source 21 in the illumination subsystem 20 has equal path lengths to each of the light valves, and equal path lengths exist from the light valves to the projection subsystem 40. This equalization of the distance of the input light to the light valves and the equalization of the distance of the output light from the light valves to the projection subsystem maximizes the light collection efficiency according to the present invention. By this structure, the red, green, and blue images of the projection display system are projected in focus onto the projection screen with optimum illumination across each of the three color images.

Figure 1:
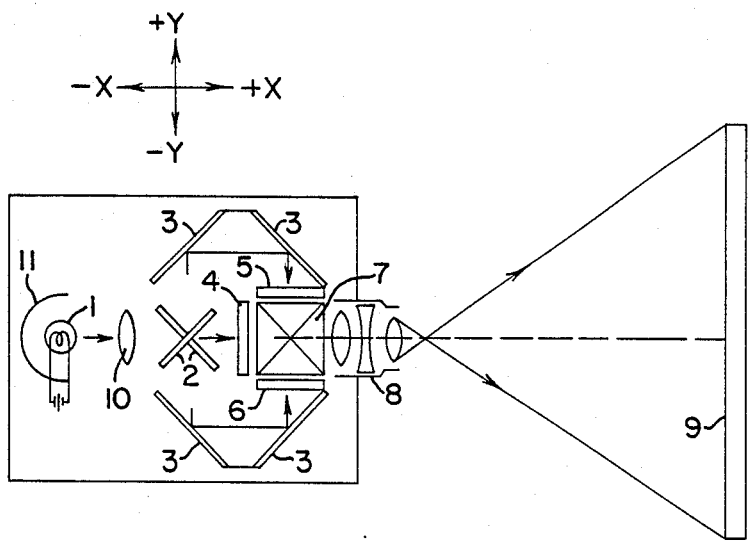
FIG. 1 illustrates a schematic view of a liquid crystal projection TV system in the prior art, FIG. 2 schematically illustrates a liquid crystal projection display arrangement according to the present invention.

A further improvement of this projection display of the present invention is that the dichroic prism 7 in FIG. 1 of the prior art is eliminated. Such a prior art dichroic prism is expensive because of its complexity and size. By the use of the flat dichroic filters 31, 32, 37, and 38 in the optical system of the present invention, this expense in the prior art is eliminated.

The respective field lenses 34, 34', 34" on the illuminating sides of each LCD maximize the amount of light passed through each of the LCDs. Since the LCDs have maximum contrast when illuminated with collimated light, the field lenses 34, 34' and 34" on the illumination side of the LCDs are designed to collimate the respective beams. Accordingly, the focal lengths of these lenses may be chosen to be the distance from the exit pupil of the illumination subsystem 20 to the lenses. The field lenses 36, 36' and 36" on the projection side of the LCDs maximize the collection efficiency of the projection subsystem 40 by redirecting the light toward the center of the projection lens system 41. Aberrations that might be introduced by the field lenses 36, 36' and 36" may be corrected in the design of the projection subsystems.

It is possible to eliminate some or all of the field lenses if a simpler light path is desired to reduce costs, for example. However, if this is done, the projected illumination will be reduced. Accordingly, the use of the field lenses represents a more optimal embodiment of the present invention.

The transmissive optical elements of the projection TV system according to the present invention may also have anti-reflection coatings to maximize light efficiency. Such anti-reflection coating may be especially appropriate for those elements having air interfaces.

Figure 16B:
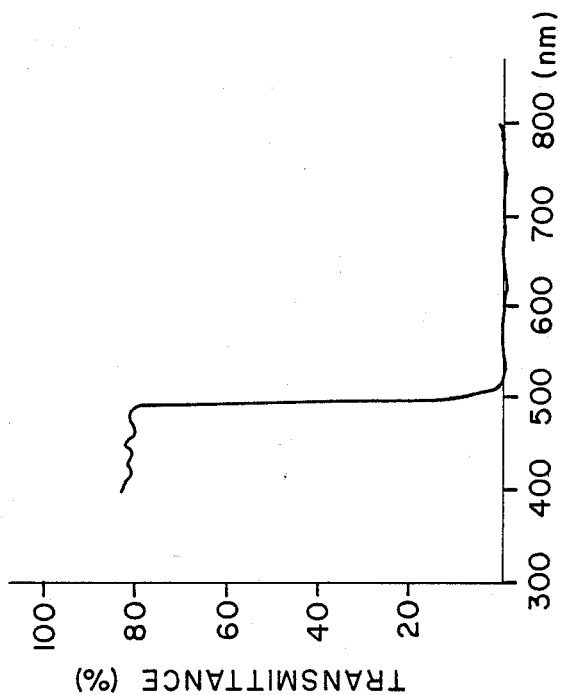
FIG. 16a, 16b, and 16c illustrate transmission functions of various filters used to separate light into red, blue, and green channels according to the present invention.
Figure 16A:
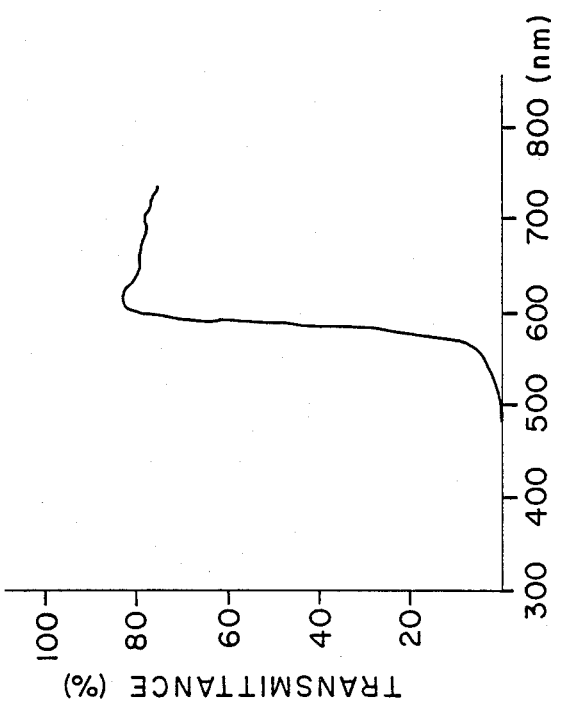
Figure 16C:
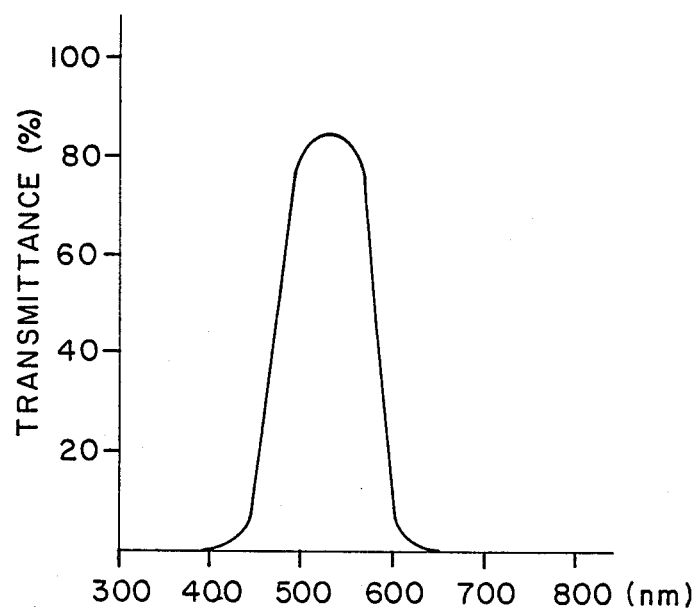

Among the many variations and alternative embodiments of the present invention, the optical layout may be modified to change the locations of the three color channels. For example, the red and blue color channels may be interchanged by changing the reflecting filter 31 to a red and green reflecting filter in which case the mirror 33 would reflect blue light and the dichroic filter 37 would pass blue light and reflect green light. Also mirror 39 would reflect red light while dichroic filters 32 and 38 would pass red light. If the green channel were moved from the center of the modulation subsystem, then band-pass filters such as represented by FIG. 16c, rather than high and low pass filters as represented by FIGS. 16a and 16b, would be required.

Figure 3:
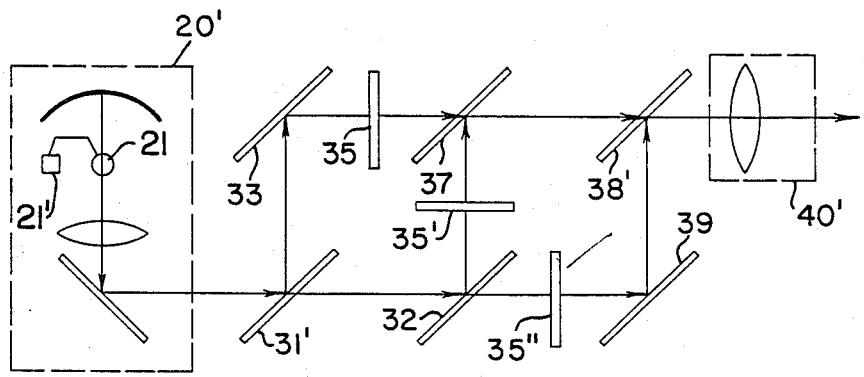
FIG. 3 illustrates a schematic of an alternative arrangement of the illumination subsystem and projection lens subsystem for the display of the present invention.

An alternative arrangement of the projection display system according to the present invention may be seen by reference to FIG. 3 in which the entrance and exit locations of the illumination subsystem 20 and projection subsystem 40 can be changed. For example, the illumination subsystem may be moved to the position 20' in which light enters the modulation subsystem from the left side. In this case, a red reflecting dichroic filter 31' would be located at the entrance of the modulation subsystem. The projection subsystem 40 may also be moved so that the light valves are imaged to the right in the alternative position of the projection subsystem 40'. In this case a blue reflecting dichroic filter 38' would pass images formed by the three LCDs into the projection subsystem 40'.

Figure 4:
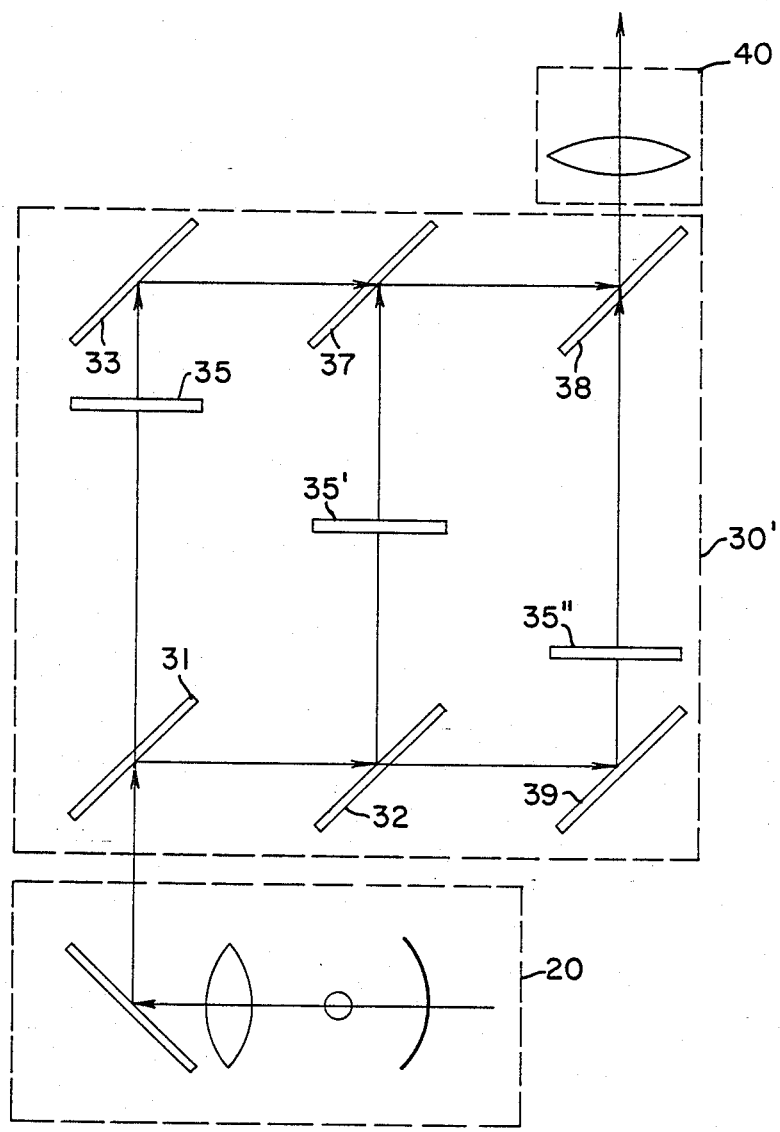
FIG. 4 illustrates a further alternative configuration that allows for more room for field lenses and FIG. 5 illustrates a schematic alternative configuration for minimizing unwanted reflections from the rear surface of the dichroic filters in the present invention.

Another alternative to the arrangement in FIG. 2 may be seen in FIG. 4 in which the space between the two rows of filters 31, 32 and 37, 38 can be expanded indefinitely while maintaining an equal path attribute. This arrangement in FIG. 4 is a less compact embodiment of the system. The extra space may accommodate thicker lenses at opposite sides of the light valves, or merely allow more room for adjustment of the light valves.

Figure 5:
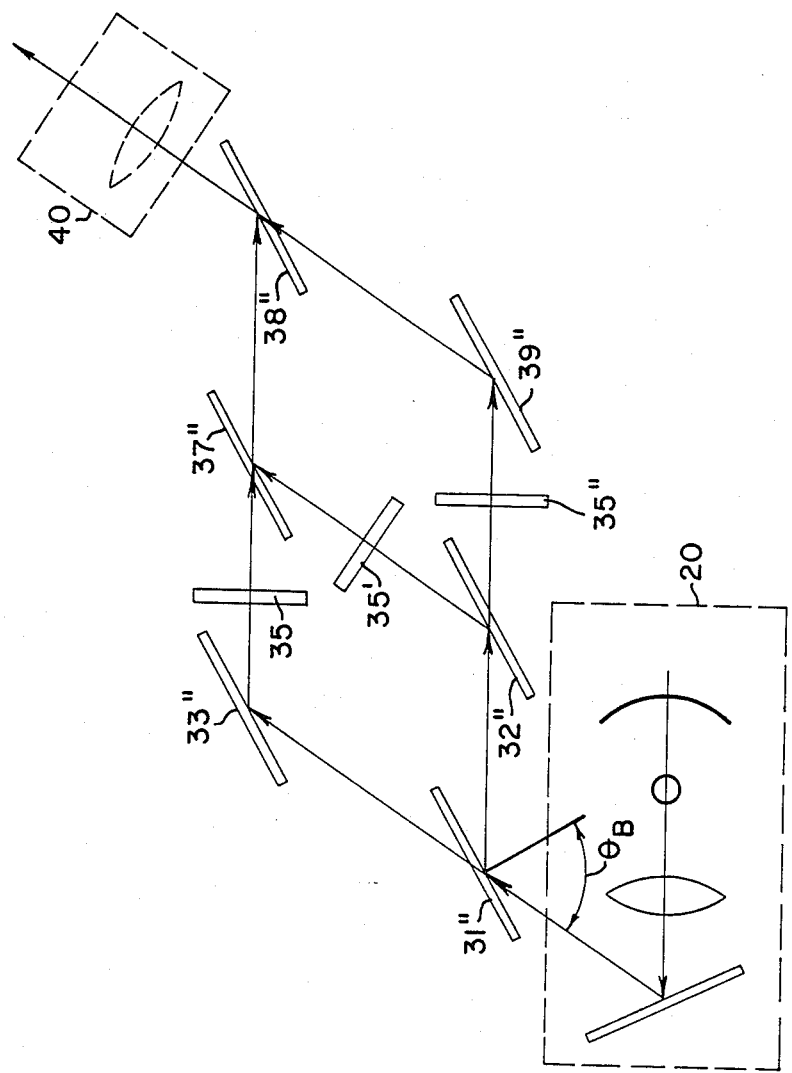

In a different arrangement of the system, the angle of reflection of the various components do not have to be designed with 90° reflections from mirrors 33 and 39. That is, FIG. 5 illustrates a configuration that is designed to minimize unwanted reflections from the rear surfaces of the dichroic filters 31", 32", 37" and 38". This system is constructed to provide angles of incidence and reflection at Brewster's angle, $\theta_B$. At Brewster's angle the "s" polarized light suffers no reflection losses. The system is skewed into a parallelogram shape with the illumination subsystem 20 providing light to the dichroic reflector 31" at Brewster's angle. Reflections from the various dichroic filters and mirrors 33" and 39" are also at Brewster's angle. The light valves or LCDs 35, 35' and 35" are placed perpendicular relative to the light direction.

Figure 22:
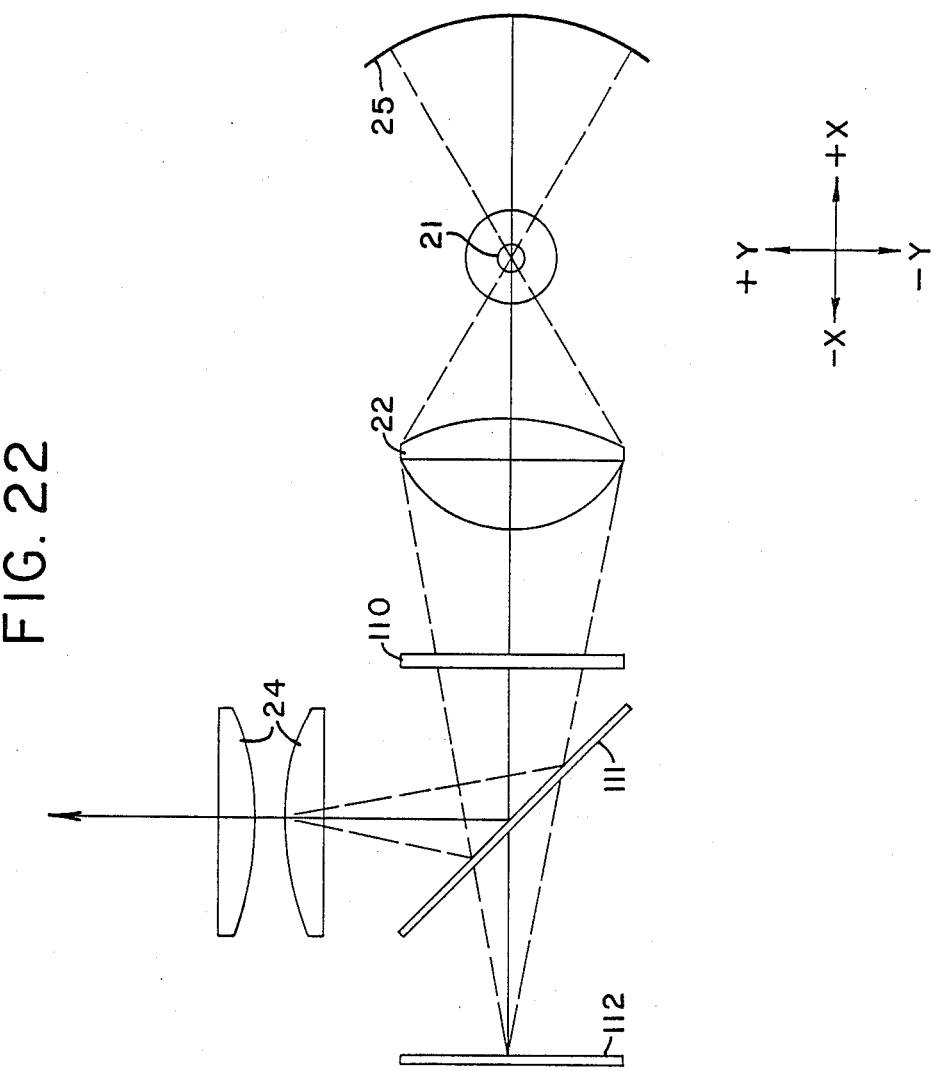
FIG. 22 illustrates an embodiment of the present invention that utilizes light of all polarizations from the light source.
Figure 23:
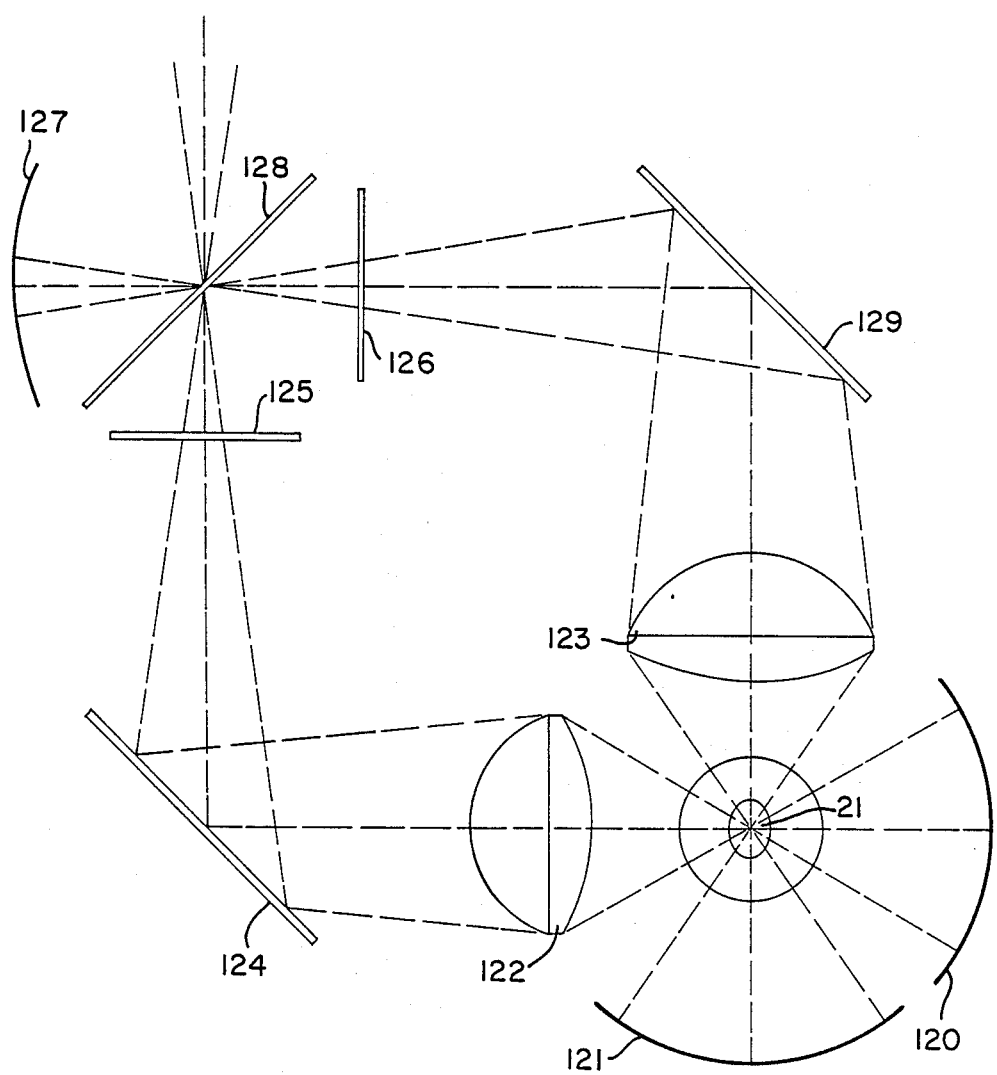
FIG. 23 illustrates a further embodiment of an illumination subsystem utilizing light of all polarizations for collecting the light from the light source.
Figure 24:
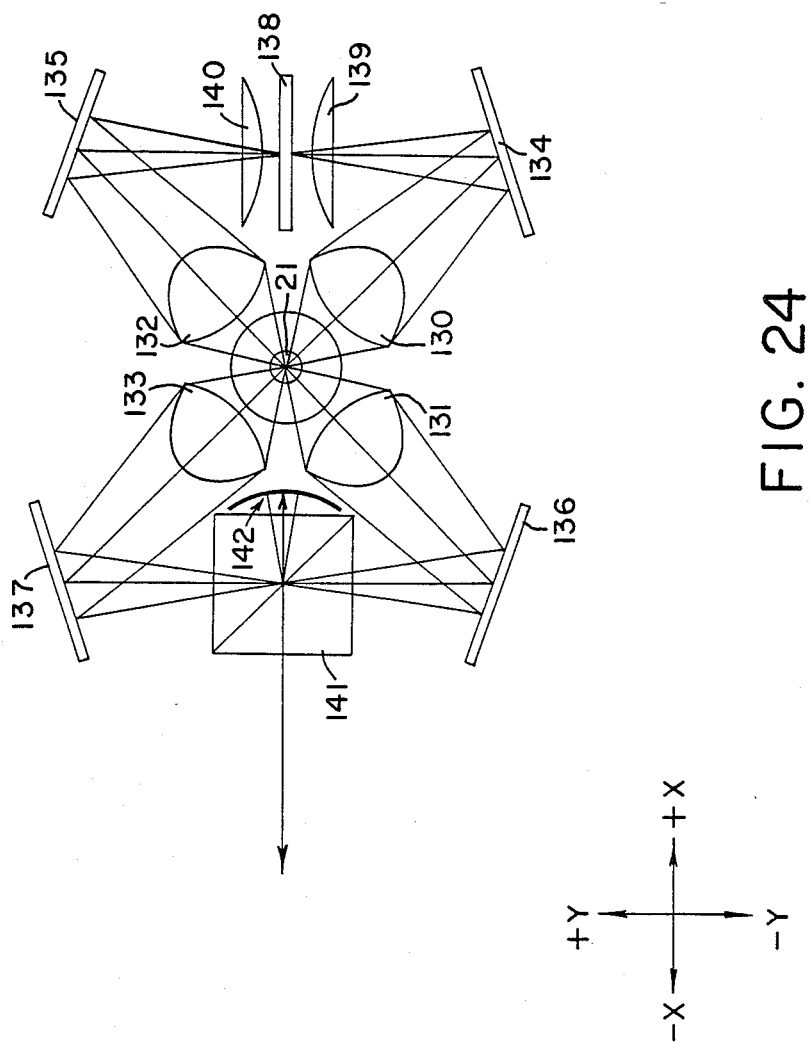
FIG. 24 illustrates another embodiment of an illumination subsystem using light of all polarizations for collecting the light according to the present invention.

Typically in these different variations of the modulation subsystem in which TBLVs are used, polarization sheets may be applied directly to opposite sides of the light valves as respective polarizers and analyzers. If an illumination scheme is utilized that yields linearly polarized light, such as seen in FIGS. 22–24, for example, the polarizers on the illumination side of the LCDs may be dispensed with. The second polarizer, or analyzer, on the opposite side of each LCD may also be replaced by a single polarizer placed after dichroic filter 38 or 38' where the light beams are recombined. Such single analyzer also may be used with a polarizer before each of the three LCDs. If the polarizing sheets are replaced or exchanged for any reason, care must be taken to maintain the state of polarization of the light in the proper mode.

Figure 6:
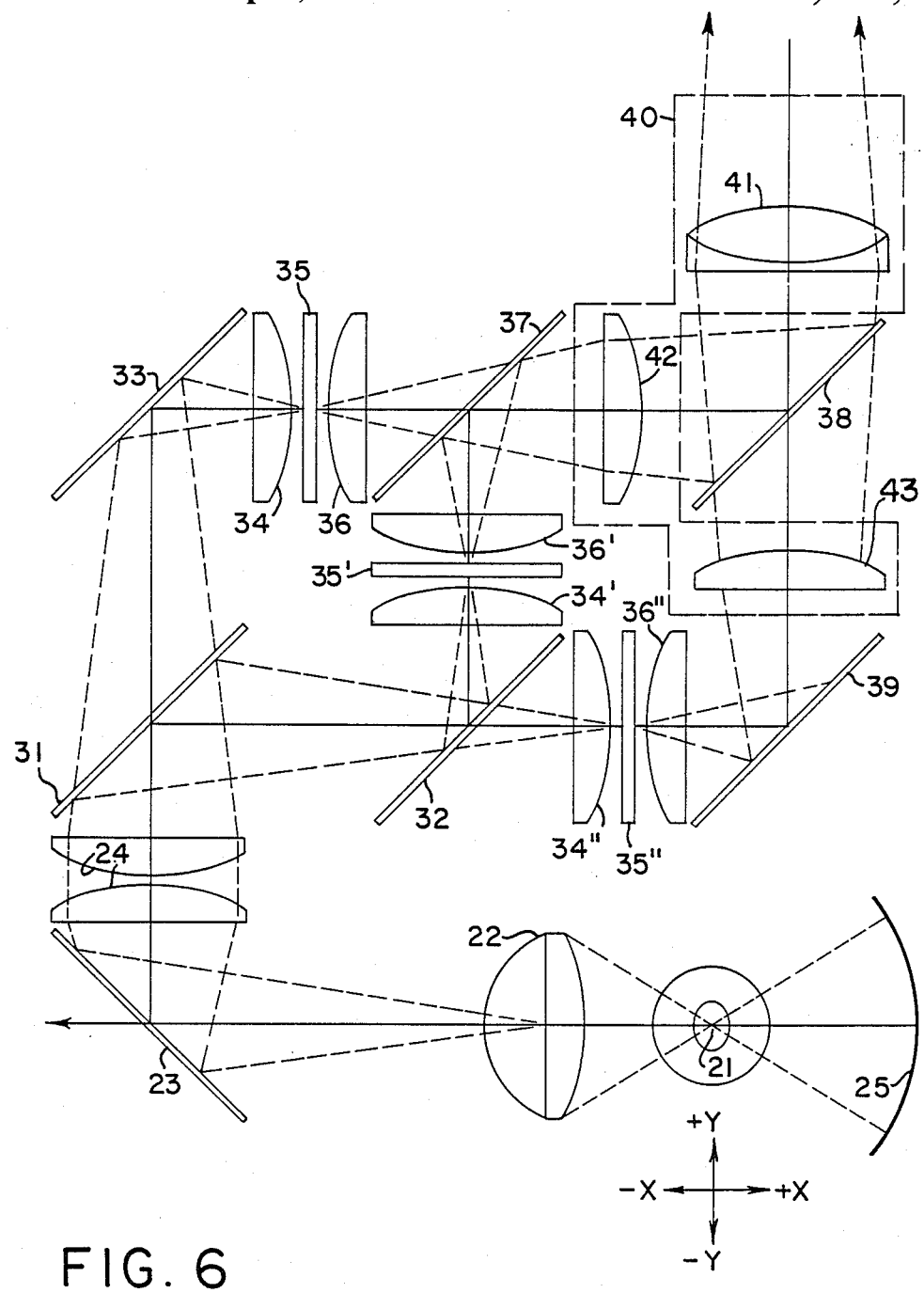
FIG. 6 illustrates another embodiment providing alternative locations for elements of the projection lens subsystem according to the present invention.

Another embodiment of the projection display system according to the present invention may be seen in FIG. 6 where elements of the projection subsystem may be combined into the modulation subsystem. In this arrangement, lens components 42 and 43 of the projection subsystem 40 may be incorporated into positions in the modulation subsystem between the reflecting filters 37 and 38, as well as between the mirror 39 and filter 38.

Figure 10:
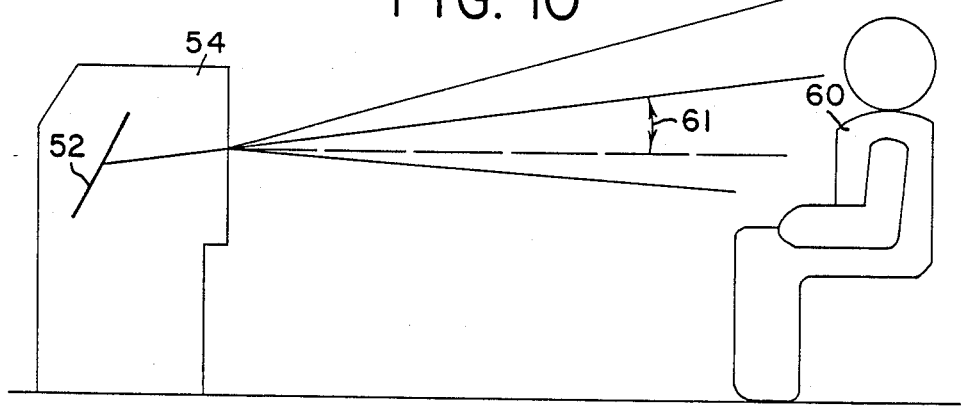
FIG. 10 illustrates a typical projection display system in which the present invention is utilized, FIG. 11 schematically illustrates a critical illumination system of the present invention, FIG. 12 schematically illustrates a Kohler illumination system according to in the present invention, FIG. 13 schematically illustrates a hybrid critical/Kohler illumination system as used in the present invention.

In the system of FIG. 2 where the projection lenses are placed in the projection subsystem after combination of the three colors, the projection subsystem could either have a long throw distance (the distance from the last surface of a projection lens to a screen) or a complex design. Such a complex lens design could either have intermediate images or be of the reversed telephoto type. Typically, the back focal length (bfl) may be about 10 inches, and the magnification of the projection subsystem is about 12X. Since for a simple lens system the magnification is approximately equal to the throw distance, or image distance, divided by the bfl, or object distance, the throw distance would then be about 120 inches. Although this is a suitable solution for a front projection system, it is not as suitable for a rear projection system since the long throw distance could not be folded into a compact cabinet, such as seen in FIG. 10.

Accordingly, the placing of projection lenses into spaces within the modulation subsystem, such as seen in FIG. 6, may be carried out to reduce the dimensions of rear projection TV cabinets. With this arrangement, if the entire projection lens system were assumed to be simple and were put into the spaces of lens components 42 and 43 in the modulation subsystem, the throw distance is decreased from 120 inches to 60 inches because the bfl is reduced from 10 inches to 5 inches.

If the projection lens subsystem were complex, i.e. having a reversed telephoto lens, or a lens system with at least one intermediate image, the first lens group of a system could be placed into the spaces 42 and 43 of the modulation subsystem of FIG. 6.

Further advantages of this variation may be significant. For example, if the throw distance is shorter, the cabinet may have smaller dimensions and the projection lenses may have a smaller diameter. Also, since lens systems or groups of lenses in the modulation subsystem are acting only on a portion of the spectrum, instead of the entire spectrum the lenses would be easier to color correct since they need only be color corrected for a smaller wavelength region. Also, color aberrations may be easier corrected in the simpler optical display.

In a further attempt to reduce the size of a system, the space between the dichroic filters 31 and 32, as well as between the filter 31 and mirror 33, could be used by the illumination subsystem 20. For example, the substage condenser lens 24 could be replaced by three lenses placed into these regions respectively. These are all variations of the present invention to reduce the size of the optical system for a light valve projection display system.

Figure 7:
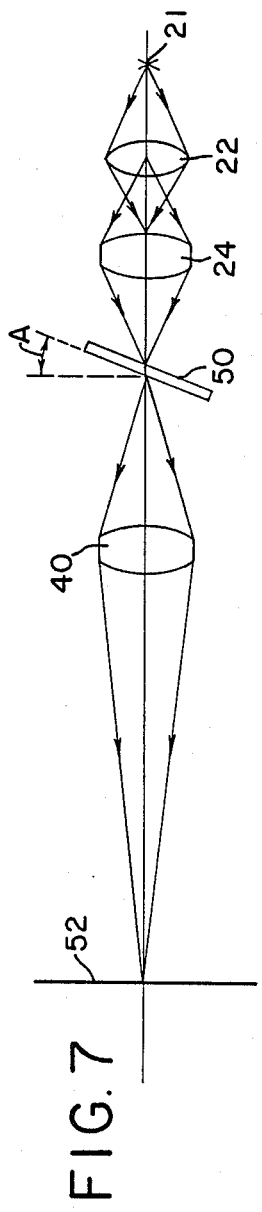
FIG. 7 illustrates a further embodiment of the optical system for the present invention using a tilted light valve.

Another alternative to the previous arrangements is to utilize tilted light valves or LCDs. Such components sometimes transmit light more efficiently at non-normal incidence, rather than at normal incidence. Because of this, it may be desirable to tilt the LCDs, for example, with respect to the incident illumination. The tilt angle A would be chosen to maximize the transmission of the LCDs, such as shown in FIG. 7.

A disadvantage of this is that the projected image of the LCD 50 has trapezoidal distortion upon tilting the LCD. The image is also defocussed in one dimension of the screen 52 such that only one narrow linear region in the picture will be in focus.

Figure 8:
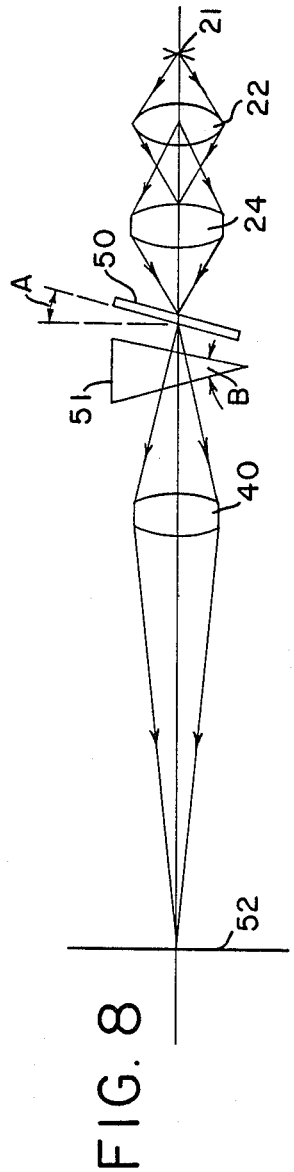
FIG. 8 illustrates a variation of the tilted light valve according to FIG. 7.

A solution to this problem occurs by placing a prism 51 just behind the LCD 50, or light valve, as seen in FIG. 8. The angle B of the prism is chosen so that the LCD, as viewed from the projection lens 40, no longer appears to be tilted. Using small angle approximations, if the refractive index of the prism 51 is N, and the tilt angle of the LCD is A, then the required prism angle, B, is given by $$B = \frac{A}{(N-1)} \quad (1)$$

By using the prism angle B, as calculated from equation 1, the image of the LCD at the screen 52 will be free of trapezoidal distortion, and will be in correct focus over the entire picture area.

Figure 9:
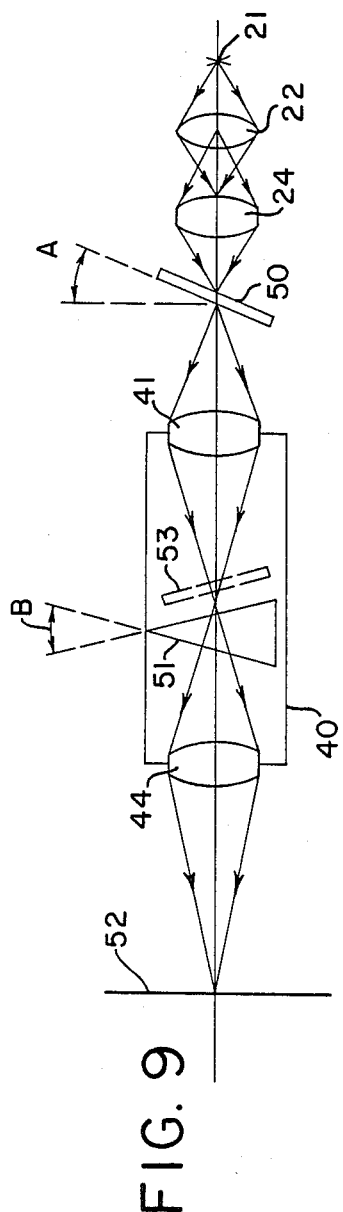
FIG. 9 illustrates another variation of the tilted light valve of FIG. 7 according to the present invention.

FIG. 9 illustrates a further arrangement of this embodiment in which the prism 51 is placed adjacent an intermediate image 53, if one exists, of the tilted LCD 50 within the projection lens system 40 to bring the projected image of the light beam into focus. The required prism angle B would depend upon the magnification, M, of the intermediate image of the LCD, as well as the tilt angle A of the LCD. To a first order of approximation, the required prism angle B is given by $$B = \frac{A}{M(N-1)} \quad (2)$$

FIG. 10 illustrates a typical projection video system in which the center of the projection screen 52 is lower than the center of the viewing space of the audience provided by observer 60, so that an elevation angle 61 is introduced into the system to redirect the light to the viewing audience. This is accomplished by tilting the mirror or screen 52 in order to obtain the elevation angle 61. The image on the screen may suffer from trapezoidal distortion, but a prism, such as used for the tilted LCD, may be designed to account for any such trapezoidal distortion.

In a similar manner, a prism could be used to compensate for a downward projection angle when projecting from a ceiling to a screen, such as could be used in aircraft. Also a prism may be used to correct for trapezoidal distortion.

In the illumination subsystem illustrated in FIG. 2, for example, several common methods of illumination can be utilized. The two most common methods of illumination are critical illumination and Kohler illumination. These methods have their origins in microscopy, but they have been used for many other applications. As such they are useful in display systems according to the present invention using light valves. A discussion is provided of their use in projection TV systems using LCDs.

Figure 11:
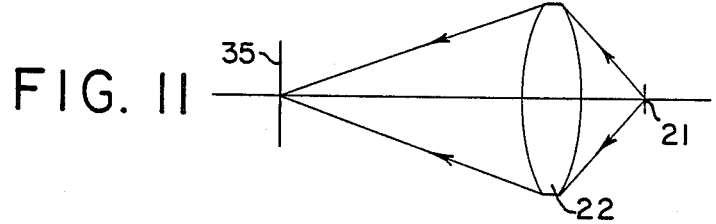

FIG. 11 shows light valve or LCD 35 illuminated by critical illumination. In this arrangement, the source 21 is imaged directly onto the LCD 35. A magnification is chosen so that the image of the source covers the LCD. To maximize the brightness, the condenser lens 22 is chosen to have a high numerical aperture, such as about 0.65.

Figure 12:
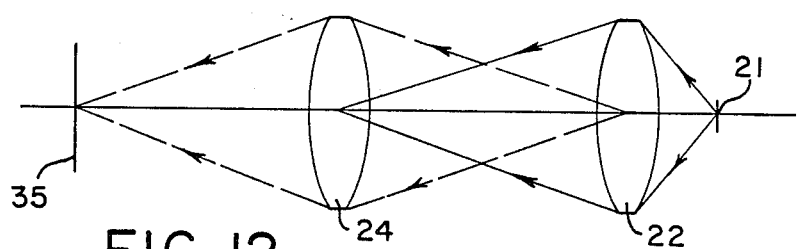

FIG. 12 illustrates the LCD 35 illuminated by Kohler illumination. In this method of illumination, the substage condenser lens 24 is used to form an image of the entrance pupil of the condenser lens 22 in the plane of the LCD 35. The advantages of this are that the brightness and color nonuniformities of the light source 21 do not appear in the plane of the LCD 35.

Figure 13:
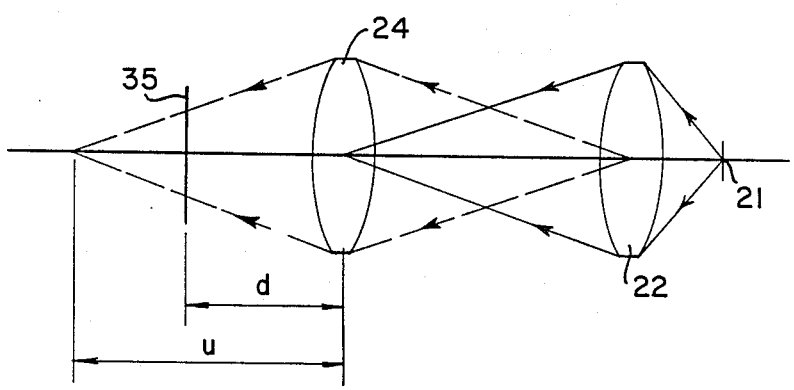

These two techniques of illumination have both advantages and disadvantages. For metal halide type arc lamps with the configurations discussed according to the present invention, there are strong advantages in using Kohler illumination. For other lamp types, it is sometimes better to choose critical illumination, or even a hybrid type of illumination lying between critical and Kohler illumination. Critical, Kohler, and hybrid critical/Kohler illumination configurations can be obtained by adjusting the position of the Critical illumination is produced by positioning the LCD 35 close to the substage condenser lens 24 in FIG. 13 wherein the distance d=0. Kohler illumination is produced by positioning the LCD 35 at the image of the substage condenser lens 24 in which the distance d=u. By positioning the LCD at an intermediate location wherein 0<d<u, a hybrid critical/Kohler illumination can be produced. Thus, the three types of illumination can be classified as (1) d=u, Kohler illumination; (2) d=0, critical illumination; and (3) 0<d<u, hybrid critical/Kohler illumination.

In the case of critical illumination, the LCD lies in the plane of the lens 24. Since this lens introduces no optical power into the system, it can be removed from the system. In this way, the arrangement reduces to the more usual presentation of critical illumination, as illustrated in FIG. 11.

In Kohler illumination, the pupil of the lens 22 in FIG. 12 is imaged onto the LCD 35. Since each point of the entrance pupil receives light from all points of the light source 21, color or brightness variations across the source will not affect the uniformity of illumination of the LCD. Since metal halide lamps have significant color and brightness variations across their source area, Kohler illumination is the most suitable type of illumination to use.

Although an anamorphic projection system could be selected, usually the modulators will have an active area such that the width and height are of the same proportions as the desired proportions of the width and height of the projected image. The size of a light valve system is largely governed by the size of the modulation subsystem 30 shown in FIG. 2. To make the modulation subsystem as compact as possible, the mirrors 33 and 39 and the color filters 31, 32, 37 and 38 may be chosen so that their projected area onto the plane of the LCDs is about the same as the active area of the LCDs. For the same reason, the diameters of lenses 24, 34, 36, 34', 36', 34" and 36" are chosen to be about the same as the diagonal across the active area of the LCDs. The active area of the LCDs may be formed, for example, with dimensions 2.25 inches by 3 inches. The diameter of the lenses just indicated would than be approximately 3.75 inches. If the mirrors and color filters are inclined at 45 degrees as shown in FIG. 2, their dimensions may be at least 3.2 inches by 3 inches. Although more light could have been collected by using larger components than those just indicated and redesigning the system, such options must be weighed against system compactness.

Lens 22 is chosen to have a high numerical aperture (typically 0.65) and to have a long enough back working distance to accommodate the lamp 21. It would be conceivable to chose the diameter of lens 22 to be greater than that of lens 24. However, as indicated in FIG. 2, it can be chosen smaller without significantly affecting the amount of light collected. The advantage of a smaller diameter for lens 22 is that it will have a shorter focal length (for a given numerical aperture) and this will result in a more compact system.

Apart from constraining the size of the lenses and mirrors, the optics are otherwise designed to collect as much light as possible from the light source 21. With this system, efficiency is maximized when the image of the source fills the pupil of the lens 24. Since the arc of a metal halide lamp is long and narrow, and the LCDs may have an aspect ratio of 4:3, a cylindrical lens might be used in the illumination subsystem to optimize the light efficiency of the subsystem and give greater magnification in the direction of the width of the light source 21. In cases where the light source has a less elongated shape, such as when two lamps are used side-by-side (see FIG. 25), or two arcs are side-by-side within a lamp (see FIG. 26), or when a modified lamp structure is used (see FIGS. 19 and 20), there would be less need for cylindrical lenses.

The function of lens 22 is to collect as much light as possible from the source 21. To achieve this, lens 22 is chosen to have a high numerical aperture, and accordingly, it is placed so as to magnify the source to fill the pupil of lens 24. Because a high magnification implies that the source is close to lens 22, the aperture of lens 22 will have a large angular subtense with respect to the source 21 and the lens will then collect a higher fraction of the light emitted. For a given numerical aperture for lens 22, the higher the magnification, the greater will be the fraction of light collected. Obviously, if the area of the source is small, a higher magnification with lens 22 can be used. Thus, a smaller source size is desirable and, generally, source size is an important consideration when selecting a source.

Metal halide arc sources can have extremely long lifetimes (typically at least 10,000 hours) when a long arc is used, but the long arc does not achieve good efficiency in the collection optics. A further problem with metal halide arc lamps is the long warm-up time needed (typically 5 minutes). A solution to this last problem is to have a second lamp, such as lamp 21' in FIG. 3, for example, interchangeable with the arc lamp 21, or selected by a mirror, etc., which can be used during the warm-up time of the arc lamp. A suitable choice for this second lamp could be a tungsten filament lamp which has a very short warm up time (typically a few milliseconds). Such tungsten filament lamp, or any filament type lamp, could be slid into position to illuminate the modulation subsystem until the metal halide lamp warms up. The filament lamp could be slid out of position, or alternatively the metal halide lamp and filament lamp could be interchanged in position when the metal halide lamp was sufficiently warmed up.

Figure 14:
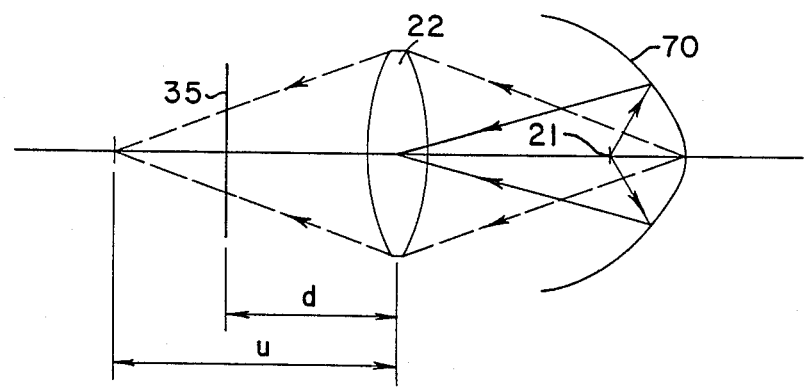
FIG. 14 illustrates a schematic arrangement for variations of an illumination system having a reflector light collection system according to the present invention.

If a xenon arc lamp is used as an alternative light source, its small arc size (of the order of 1 millimeter) enables the use of an ellipsoidal collector 70 (see FIG. 14). This configuration yields high collection efficiency. The ellipsoidal collector 70 in FIG. 14 can be considered equivalent to the condenser lens 22 shown in FIG. 12. When the xenon system is adjusted for Kohler illumination, the light distribution over the ellipsoidal collector 70 is imaged onto the LCD 35. However, because of the directional dependency of the light output from a xenon arc lamp, a nonuniform distribution of light over the ellipsoidal collector 70 will occur, and hence, a nonuniform distribution of light over the LCD occurs. In this instance, the LCD 35 will be more brightly illuminated at the edges than in the center. Since this is not acceptable for projection TV applications, Kohler illumination would not be suitable when xenon arc lamps are used with an ellipsoidal collector.

When the system illustrated in FIG. 14 is adjusted for critical illumination, the arc is imaged directly onto the LCD 35. Since xenon lamps have good color uniformity, there will be good color uniformity over the LCD. However, there will be a center-to-edge brightness variation due to the brightness variations over the arc of the xenon lamp. For projection video or TV applications, variations in brightness are acceptable as long as the LCD or light valve edge brightness does not fall below about 30% of the center brightness. Because an ellipsoidal collector, as shown in FIG. 14, is not in focus at the LCD, the uniform distribution of light over the collector is less of a problem than it is with Kohler illumination.

With xenon arc lamps, the arc shows both long term and short term positional instability which give rise to temporal fluctuations at the arc. Using critical illumination these temporal instabilities will appear in the illumination of the light valves or LCDs. Thus, critical illumination may not be entirely satisfactory for projection television applications. A more suitable type of illumination light might be the hybrid critical/Kohler illumination.

The hybrid critical/Kohler illumination provides the advantages of both the Kohler and critical illuminations, as well as the disadvantages of these types of illumination. But the advantages and disadvantages are balanced. The partial presence of Kohler illumination reduces the effect of the positional variations and brightness variations over the LCD, and the partial presence of critical illumination reduces the effect of the nonuniform brightness distribution over the pupils of the ellipsoidal collector 70. Depending on the relative weights of these different artifacts, the hybrid illumination would be adjustable by varying the distance d in FIG. 14 to give an optimum balance.

The objectives in choosing the type of light source and color separation are to maximize the brightness of the image and to achieve good color rendition.

Figure 15:
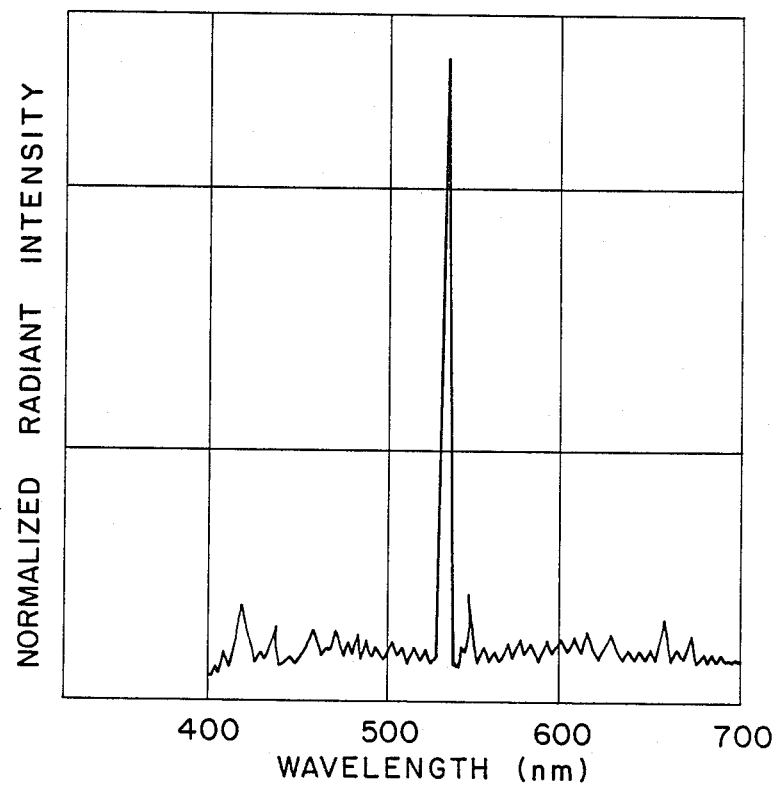
FIG. 15 illustrates the measured radiant spectral distribution for a metal halide lamp according to the present invention.

If the light source used in the projection display system of the present invention is a 250 watt metal halide lamp, a long lifetime (at least 10,000 hours) and high color temperature (of the order of 5600K) is achieved. FIG. 15 shows the measured spectral distribution of a typical 250 watt metal halide lamp. Although there is an emission spike at 530 nm, the spectrum is relatively flat in the visible region. The arc length of such a 250 watt metal halide lamp is approximately 1 inch.

The light used in the present invention is split into three color channels, such as the primary colors red, green, and blue, seen in FIG. 2, for example. All of the visible wavelengths of light may be used. This may be achieved by way of the two dichroic color separation filters 31 and 32. FIG. 16 shows the transmission function of such filters when tilted at 45° (FIG. 2). Filter 31 reflects green and blue light and passes red light into the red channel, and this may be seen by way of the transmission versus wavelength graph in FIG. 16a. Filter 32 passes blue light into the blue color channel LCD, and reflects the green light into the green channel of the green LCD. These may be seen in FIG. 16b.

Figure 17:
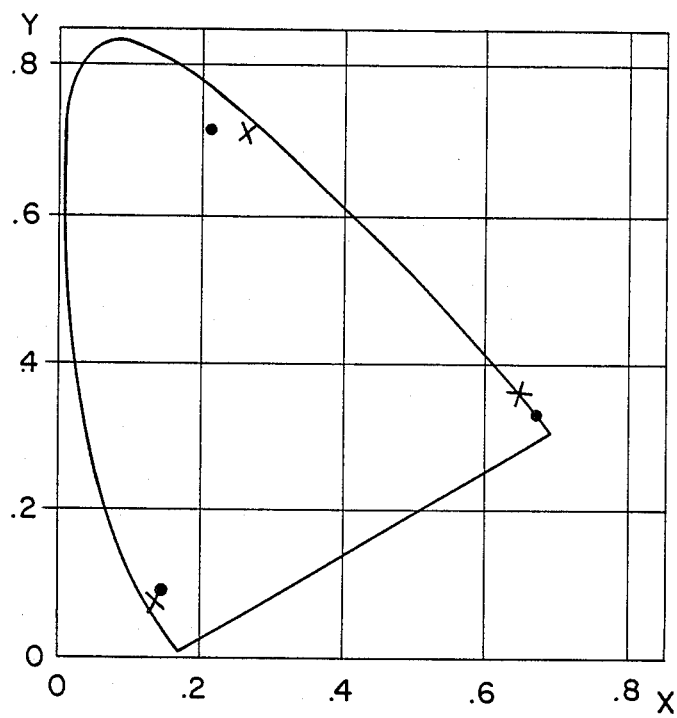
FIG. 17 illustrates a CIE chromaticity diagram comparing the NTSC standard coordinates with coordinates having red, green, and blue color channels of the display according to the present invention.

If the display is to be used for video or television display, the cutoff wavelengths may be chosen to approximately match the color triad specified of the appropriate standard. For example, the NTSC chromaticity coordinates (CIE 1931) are indicated in FIG. 17, and are given by

| blue:  | $x = 0.14$ | $y = 0.08$ |
| green: | $x = 0.21$ | $y = 0.71$ |
| red:   | $x = 0.67$ | $y = 0.33$ |

If the cutoff wavelength of filter 31 is 580 nm (FIG. 16a), and the cutoff wavelength of filter 32 is 505 nm (FIG. 16b), then the chromaticity coordinates of the three channels are given by

| blue:  | $x = 0.136$ | $y = 0.071$ |
| green: | $x = 0.264$ | $y = 0.703$ |
| red:   | $x = 0.644$ | $y = 0.356$ |

A metal halide lamp which can be used for the present invention having a broad spectrum and long lifetime also has a long warm-up period during which the color and brightness of the emitted light varies. Another type of lamp, such as a xenon arc lamp or tungsten filament light source, may be introduced into the system to operate during this warm-up period of the primary metal halide lamp. Even though these light sources have a lower lifetime, such additional light source could be temporarily introduced into the illumination subsystem until the primary metal halide light source is warmed up. The primary metal halide lamp may have warm-up periods of the order of one to five minutes. After the primary metal halide lamp is warmed up, then the secondary light source could be turned off or removed from the system.

A further alternative to the system of the present invention could be the use of more sophisticated dichroic filters, or additional filters can be introduced, so that the chromaticity coordinates match the NTSC standards more closely. In such cases, not all of the light would be used, but better color is achieved even though brightness might be somewhat lost. Such additional filters could replace mirrors 33 and 39 in FIG. 2, for example.

In addition, the spectrum of the lamp may be tuned so that the chromaticity coordinates match the NTSC standards more closely by changing the mixture of the gases in the lamp.

Figure 18:
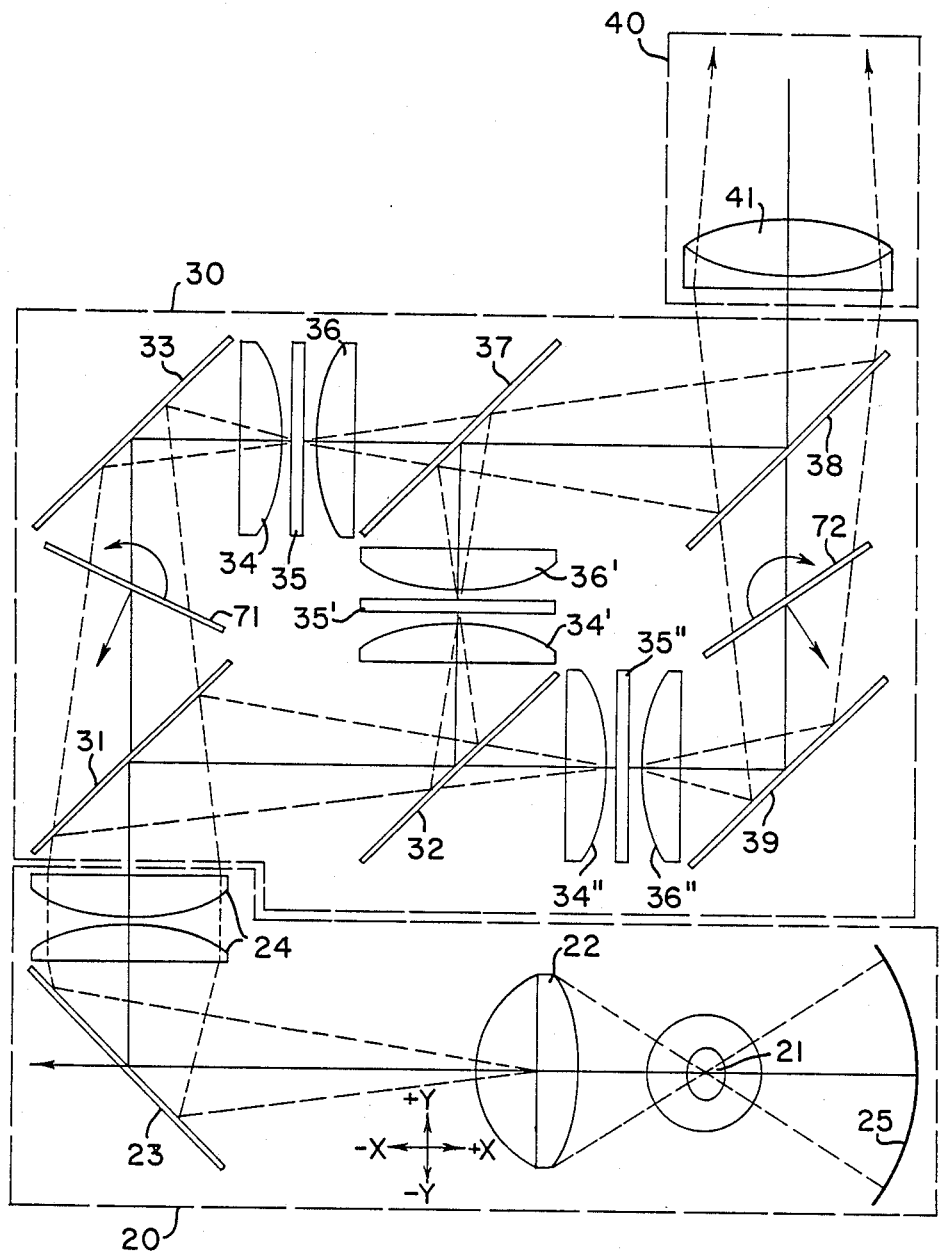
FIG. 18 illustrates a further embodiment of the present invention in which additional color filters are used to change chromaticity coordinates for the red, green, and blue color channels.

FIG. 18 illustrates an alternative embodiment in which additional filters may be inserted into the modulation subsystem. These additional filters 71 and 72 may be rotated to shift the cutoff wavelengths of the dichroic filters 31 and 32 to either longer or shorter wavelengths. Since the spectrum of the light source 21 may change over its lifetime, these additional filters 71 and 72 provide an active control over the chromaticity coordinates of the three color channels. In this case, the dichroic filters 31 and 32 are fixed in orientation and design so that they cannot be used to change the chromaticity coordinates. The additional filters 71 and 72 may be nominally identical to the original color filters 31 and 32, respectively. As an example, filter 71 can be rotated to shift the cutoff wavelength to a longer wavelength. This has the effect of shifting the chromaticity coordinates to a deeper red. Alternatively, if the filter 72 is rotated to shift the cutoff wavelength to a shorter wavelength, the chromaticity coordinates for the blue channel shifts to a deeper blue.

Various techniques have been established according to the present invention that might be utilized to increase the brightness of the image in connection with the illumination subsystem. Such techniques can be used independently of one another, or in appropriate combinations. They may be used in display systems using light valves according to the present invention including use in projection television. Such arrangements for increasing brightness may be used in any display devices where illumination is provided.

A first technique is a simple modification of the prior art. Thus, if the lamp or light source is optically dense, the light from the reflector 25 will not pass through the lamp, and accordingly, cannot be collected by the condenser lens 22. For optically dense lamps, the reflector 25 may be tilted slightly so that the image of the lamp is adjacent to the lamp. In this instance, the condenser lens 22 collects light from the lamp and the image of the lamp provided by the reflector.

Figure 19:
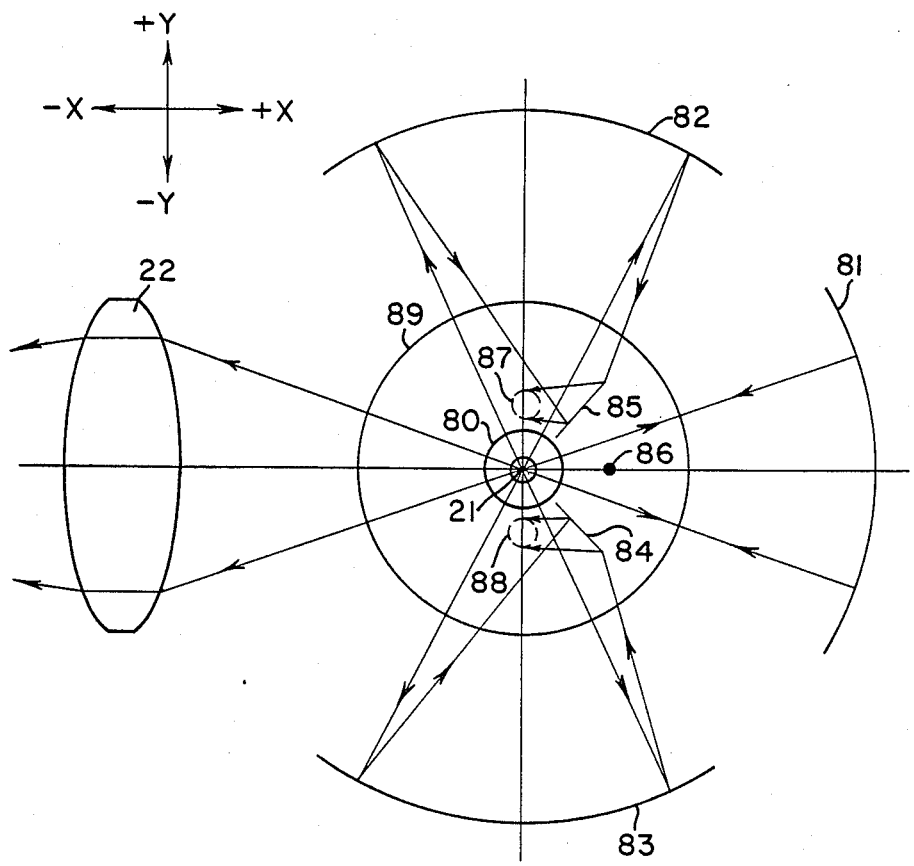
FIG. 19 illustrates a schematic arrangement of a modified illumination subsystem according to the present invention.
Figure 20:
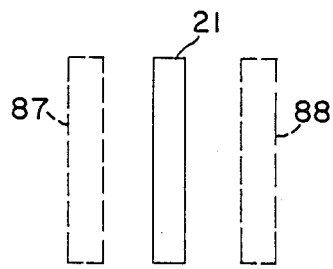
FIG. 20 illustrates the effective source as seen from the collector lens for the modified system of FIG. 19, FIGS. 21a, 21b and 21c illustrate different arrangements of illumination subsystems for light emitted according to the present invention.

Several techniques have been found according to the present invention to be usable to increase the collection efficiency from a light source by collecting light in two dimensions, rather than one. FIG. 19 shows an example of such a collection scheme in which a modified lamp/-condenser configuration is utilized having two plane mirrors 84 and 85 placed between the inner and outer envelopes 80 and 89 of a metal halide light source 21. Three curved reflectors 81, 82 and 83 are placed outside of the lamp in a generally surrounding configuration. The purpose of this arrangement is to increase the collection efficiency of the system by collecting light that is emitted in both the ±X and ±Y directions, rather than just in the ±X direction.

Reflector 81 serves the purpose to reflect light back onto itself in the −X direction, or if the lamp is optically dense, the reflector 81 forms an image of the lamp adjacent to the lamp. Reflectors 82 and 83 collect light in the +Y and −Y directions. These reflectors are tilted so that they form images of the light source 21 at point 86. The plane mirrors 84 and 85 redirect the light so that the real images of the light source 21, formed by reflectors 82 and 83, are located at points 87 and 88, respectively. The condenser lens 22 collects light from the light source 21 and light from the images of the light source formed at the points 87 and 88.

With this system, it is possible to create an effective source with a nominally square profile. The sides of the square are about the same size as the length of the arc, as may be seen in FIG. 20. In this figure, the arc of the light source 21 is in the center with its images 87 and 88. One image is produced by the mirror 84 and reflector 83, while the other image is produced by the mirror 85 and reflector 82. A generally square profile is achieved to be projected into the modulation subsystem.

The plane mirrors 84 and 85 in FIG. 19 may be made from quartz or sapphire so that they can withstand the hot environment of the light source. The reflective surface of these mirrors may be a dichroic filter or a metallized layer. The curved reflectors 81, 82, and 83 could be cold mirrors to allow the infrared to escape from the system. The curved surfaces may be aspheric, spherical, elliptical, parabolic or segmented.

Although the technique described may utilize a metal halide light source, the same principle could be applied to any type of lamp or light source. In cases where the source has only one envelope, e.g., a tungsten filament lamp, the plane mirrors could be placed either inside or outside the envelope. In all cases, the intention would be to have the condenser lens collect as much light as possible, as well as to have as small an effective source area as possible.

Figure 21A:
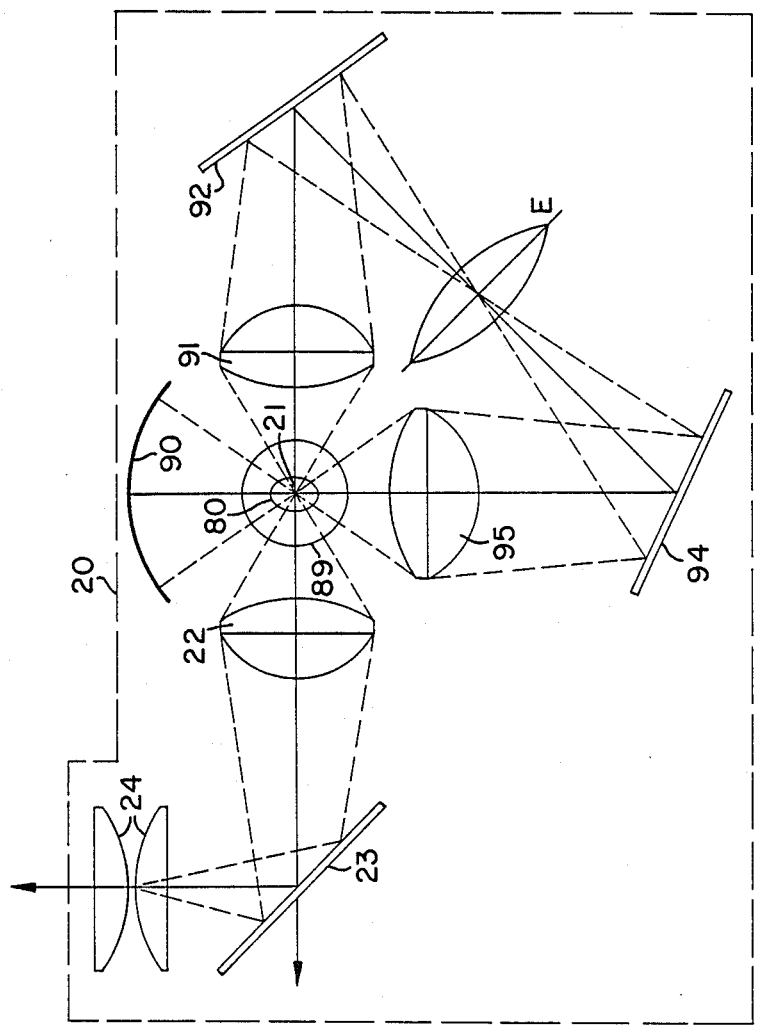

FIG. 21a illustrates another collection system designed to collect light in the ±X and ±Y directions in which the condenser lens 22 collects the light emitted from the lamp in the −X direction. Lens 95 and mirror 94 image the light emitted in the −Y direction to a plane E through the center of a field lens 93. This field lens maximizes the collection efficiency of the system. Mirror 92 and lens 91 image this image plane E onto the lamp structure including light source 21, inner envelope 80, and outer envelope 89, and the light passes through the condenser lens 22 which collects the light. The reflector 90 images the light emitted in the +Y direction back through the lamp (21, 80, 89) so that the light can follow the same path as emitted in the −Y direction. Light passing in the +X direction is imaged by the lens 91 and mirror 92 to the plane E. The image in plane E is relayed by mirror 94 and lens 95 back onto the lamp. The reflector 90 reverses the direction of this light path so that the light then follows the same path as originally emitted in the −Y direction.

Figure 21B:
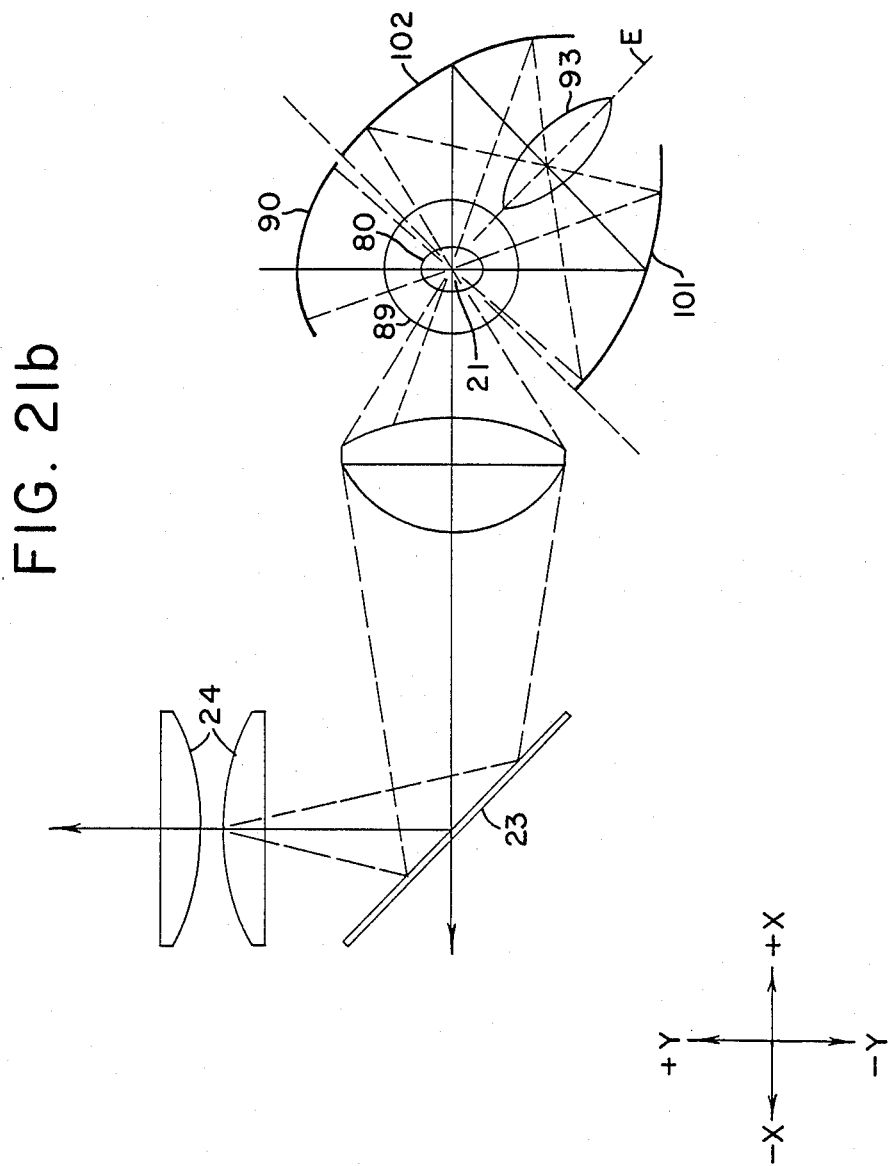

An alternative to this may be seen in FIG. 21b in which the collection efficiency of the illumination subsystem is also increased by collecting light from four sides of the light source 21. In this arrangement, a curved reflector 101 replaces the lens 95 and mirror 94 in FIG. 21a, while the curved reflector 102 replaces the lens 91 and mirror 92 in FIG. 21a. The reflectors 101 and 102 serve to focus an image of the light source 21 at the plane E at the center of the field lens 93. The reflectors 101 and 102 are aspheric in shape, and are tilted 22.5° with respect to the Y and X axes respectively so that is bent 45° upon reflection. The field lens 93 directs light rays emerging from the image E onto the respective reflectors 101 and 102 depending on the direction of the light travel.

To briefly describe this arrangement, light emerges from the source 21, in all directions so that light travelling in the −X direction passes directly through the condenser lens 22. Light starting out in the +Y direction is reflected from the reflector 90, passes by the source to reflector 101, reflects to the reflector 102 and passes once more by the source in the −X direction to be passed through the condenser lens 22. Light starting in the −Y direction also follows this latter path (from reflector 101 to reflector 102 to the condenser lens 22). Light initially emerging in the +X direction is reflected by the reflector 102 to the reflector 101 and then to the reflector 90 which reflects the light back on itself to take the reverse path back through the reflection system to emerge in the −X direction by the light source 21 to the condenser lens 22. In this manner, light emerging in all four directions is redirected to emerge from the light source in the −X direction.

A further embodiment may be seen by way of FIG. 21c in which the intermediate image at the plane E is not formed. Instead the reflectors 101 and 102 are parabolic or aspheric in shape with the axis along a 45° direction with respect to the Y and X axis respectively and the light source 21 is at the focus. Light passes between reflectors 101 and 102 in approximately parallel beams, and is refocused onto itself by either reflector. A field lens is not used in this arrangement because no intermediate image is formed.

Any or all of the reflectors in FIGS. 21a, 21b, and 21c could be made as Fresnel reflectors.

A fourth technique is useful when efficient illumination of a surface, e.g. a modulation by polarized light, is desired. For example, the use of twisted nematic liquid crystal displays (LCDs), requires polarized light. As may be seen in FIG. 22, if the light source 21 emits randomly polarized light, such as from a metal halide lamp, 50% of the light from the source 21 would not be initially used when linear polarizers are used with the LCDs. The technique illustrated in FIG. 22 shows conversion of the unused polarized light into a useful polarization state.

Thus, randomly polarized light from the source 21 passes through a quarterwave plate 110. Since the light is randomly polarized before the quarterwave plate, it remains randomly polarized after the quarterwave plate. The polarizing beamsplitter 111 separates this light into two orthogonally polarized beams: the desired polarization being reflected to the LCDs in the modulation subsystem, and the orthogonally polarized state being passed through the beamsplitter 111 to the mirror 112. This mirror reflects the orthogonally polarized light beam back through the beamsplitter 111, and through the quarterwave plate 110 in the reverse direction. The quarterwave plate is oriented such that the polarized light becomes circularly polarized. Upon reflection from reflector 25, the circularly polarized light changes its sense of rotation (for example, left hand circular polarized light becomes right hand circular polarized light upon reflection). After passage through the quarterwave plate again, the beam is converted into linearly polarized light of the desired orientation. The beam splitter 111 reflects this orientation into the LCD modulation subsystem.

Accordingly, although initially half of the light is of an undesired polarization state, by using the quarterwave plate 110 in this configuration, all of the light is converted into a polarization state that is used by the LCDs in the modulation subsystem.

Since the light source 21 generally has a wide spectral bandwidth and is an extended source, the quarterwave plate 110 and the polarizing beamsplitter 111 must be wavelength and angle insensitive.

FIGS. 23 and 24 illustrate two further alternative configurations that may be used to increase the efficiency of the polarized light that is collected. These schemes both collect light in the ±X direction and the ±Y direction, and convert the unwanted polarized state into a desired polarization state. The schemes of FIGS. 23 and 24 are similar to those in FIGS. 21a–c, but with the use of polarized light.

Thus, for example, FIG. 23 illustrates light from the source 21 emitting in all directions including ±X and ±Y. For light passing in the +X direction, the light will be reflected from reflector 120 back through the source 21. This light becomes equivalent to light initially emitted in the −X direction. Accordingly, this light is passed through condenser lens 122 to be reflected from a cold mirror 124 through quarterwave plate 125. The light then is incident at the polarizing beamsplitter 128 and the desired polarization is passed through to the modulation subsystem. The orthogonal polarization that is not passed is reflected by the polarizing beamsplitter 128 through the quarterwave plate 126 onto the cold mirror 129 which reflects the light through the condenser lens 123 through the source 21 to the reflector 121. The light is then reflected back through the system to the polarizing beamsplitter 128. The light having made two passes through the quarterwave plate 126 has now had the polarization changed to be passed by the polarizing beamsplitter 128 to the reflector 127. Light with the desired polarization will then be reflected by polarizing beamsplitter 128 to the modulation subsystem, while light of the orthogonal polarization from the reflector 127 will pass through the polarizing beamsplitter 128 and repeat the journey to reflector 121 and return to the polarizing beamsplitter. This time, the light having twice passed through the quarterwave plate 126, the polarization state will be such that the light is reflected by the polarizing beamsplitter 128 and pass through the quarterwave plate 125, cold mirror 124, condenser lens 122, the source 21 to the reflector 120. From the reflector 120 the light will retrace its path to the polarizing beamsplitter 128. This time, having made two further passes through the quarterwave plate 125, it will pass outwardly through the polarizing beamsplitter 128.

The light initially emitted in the ±Y direction involves light being emitted in the −Y direction, reflected from reflector 121 through the source 21, and becoming equivalent to light being originally emitted in the +Y direction. This light passes through the condenser lens 123, is reflected from the cold mirror 129 through the quarterwave plate 126, and arrives at the beamsplitter 128. Half of this light will be of a polarization such that it will be reflected from the polarization beamsplitter 128 to pass through the optical system to the reflector 120, and then return in the reverse direction to the polarizing beamsplitter 128. This light having passed through the quarterwave plate 125 twice will then be of a polarization state to pass through the polarizing beamsplitter 128 to the illumination subsystem. The other half of the light will pass through the beamsplitter 128 to the reflector 127. This light will be in the same polarization state, position and direction as that portion of light originally emitted in the ±X, direction. Accordingly, the earlier description of the subsequent path taken by that light will apply.

The final result is that all light emitted in generally ±X and ±Y directions by the light source 21, which is not absorbed or vignetted, will eventually emerge to the illumination subsystem in the same general direction with the same linear polarization state.

FIG. 24 sets forth a further embodiment of the illumination subsystem to achieve linearly polarized light travelling generally in the same direction from an unpolarized light source emitting light in all directions. This scheme utilizes light from the source 21 being passed outwardly through the four condenser lens 130, 131, 132, 133. Light initially emitted to pass in through condenser lens 131 will reflect from mirror 136 to the polarizing beamsplitter 141. Half of this light will be of a linear polarization to reflect illumination subsystem. The other half of the light will be of a polarization to pass through polarizing beamsplitter 141 to mirror 137 where it will be reflected through condenser lens 133, through the source 21, through condenser lens 130, and reflect from mirror 134. This light is reflected through field lens 139, polarization rotating element 138 (such as a liquid crystal) which rotates the polarization by 90°, field lens 140 to mirror 135 to return by condenser lens 132 to the source 21. At this point the light is equivalent to light originally passing through condenser lens 131 except that on the next encounter with polarizing beamsplitter 141, all of the light will be reflected outwardly from the illumination subsystem.

Light originally emitted from source 21 through condenser lens 132 will arrive at polarizing beamsplitter 141 by mirrors 135, 134 and 137. This light will be partially reflected to reflector 142, and partially passed through to reflector 136. If the light reflected by reflector 142 is of the polarization state to pass through polarizing beamsplitter outwardly from the illumination subsystem, it will so pass, while if the light reflected by reflector 142 is reflected by polarizing beamsplitter 141 to reflector 137, it will be reflected through condenser lens 133, source 21, condenser lens 130 to reflector 134. From reflector 134 the light will pass through field lens 139, polarization rotator 138 to rotate its polarization by 90°, field lens 140 to reflector 135 where it will be reflected through condenser lens 132, light source 21, condenser lens 131 to reflector 136 with the appropriate polarization to be subsequently reflected outwardly by polarizing beamsplitter 141. The light being passed by polarizing beamsplitter 141 to reflector 136 will be reflected through condenser lens 131, source 21, condenser lens 132 to reflector 135 where it is reflected through field lens 140, polarization rotator 138 to rotate its polarization by 90°, field lens 139 to reflector 134. From reflector 134 the light is passed through condenser lens 130, source 21, condenser lens 133, reflected from reflector 137 to polarizing beamsplitter 141 where it is reflected to reflector 142 to be reflected through the polarizing beamsplitter 141 outwardly from the illumination subsystem.

Light originally emitted through either of the other condenser lenses 130 or 133 will follow similar general light paths to those discussed above to eventually pass outwardly from the illumination subsystem with the proper linear polarization state.

Figure 25:
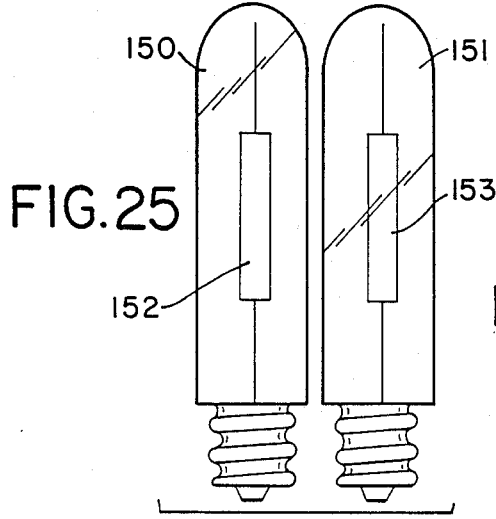
FIG. 25 illustrates a schematic arrangement of two light sources in an illumination subsystem according to the present invention.
Figure 26:
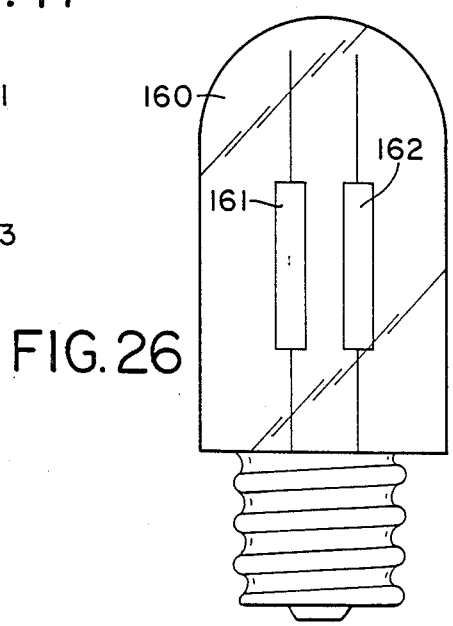
FIG. 26 illustrates an alternative arrangement of a light source according to the present invention.

A final technique of increasing brightness in this system of the present invention is to use two closely spaced light sources, such as the two lamps illustrated in FIG. 25, or the single lamp with two active areas shown in FIG. 26. This effectively doubles the brightness of the system. The ideal lamp for a liquid crystal display would have a small source area since LCDs have a maximum contrast when illuminated by collimated light, and the light collection efficiency may be maximized. A 250 watt metal halide lamp has an arc length of the order of 1.06 inches, while a 400 watt metal halide lamp has an arc length of about 1.89 inches. The 400 watt lamp emits more light than the 250 watt lamp, but the efficiency of the system is lower because it is difficult to collect and collimate the light from the longer arc.

In the scheme of FIG. 25, two 250 watt lamps in close proximity to each other are used. In this case, the effective source area is no longer than about 1.06 inches in either dimension, but the system has twice the brightness. Each of the lamps 150 and 151 in FIG. 25 have active areas 152 and 153, respectively, which provide the arc length of the lamps.

In FIG. 26, a single lamp 160 is illustrated having two active areas 161 and 162 contained within the lamp. The length of each active area can be controlled to maximize the light collection efficiency.

What we claim:

1. A display system comprising an illumination subsystem providing a single illuminating beam, a modulation subsystem, and a projection subsystem, wherein said modulation subsystem includes at least two transmission light valves, each of said transmission light valves directly passing at least a portion of said single illuminating beam to said projection subsystem, each of said transmission light valves being disposed at a first path length from said illumination subsystem, said first path length being equal for all transmission light valves, and each of said transmission light valves being disposed at a second path length from said projection subsystem said second path length being equal for all transmission light valves.

2. A display system according to claim 1, wherein at least three light valves are included in said modulation subsystem.

3. A display system according to claim 1, wherein said illumination subsystem includes an elongated light source having a length in the range of 0.3 to 1.5 inches.

4. A display system according to claim 3, wherein said elongated light source has a length of at most about 1.06 inches.

5. A display system according to claim 3 or claim 4, wherein said light source is an elongated arc.

6. A display system according to claim 1 or claim 3, wherein said light valves in said modulation subsystem include three transmission liquid crystal displays, a first of said liquid crystal displays modulating red light, a second of said liquid crystals displays modulating green light, and a third of said liquid crystal displays modulating blue light.

7. A display system according to claim 6, wherein said modulation subsystem further includes a series of dichroic filters and mirrors for passing light through a respective one of said three liquid crystal displays and for recombining each of said red light, said green light, and said blue light before said projection subsystem.

8. A display system according to claim 6, wherein said illumination subsystem provides one of critical illumination, Kohler illumination, or a combination of critical illumination and Kohler illumination.

9. A display system according to claim 6, wherein said illumination subsystem includes a light source, at least one reflector means for collecting light not passing to said modulation subsystem, and a condenser lens system for passing light to said modulation subsystem, said at least one reflector means redirecting said light not previously passing to said modulation subsystem to said condenser lens system.

10. A display system according to claim 1 or 2, wherein said illumination subsystem provides one of critical illumination, Kohler illumination, or a combination of critical illumination and Kohler illumination.

11. A display system according to claim 1, wherein said illumination subsystem, said modulation subsystem, and said projection subsystem provide a projection TV system.

12. A projection TV system comprising an illumination subsystem providing a single illuminating beam, a modulation subsystem, and a projection subsystem, wherein said modulation subsystem includes at least two transmission light valves, each of said transmission light valves directly passing at least a portion of said single illuminating beam to said projection subsystem, each of said transmission light valves being disposed at a first path length from the illuminating substage, said first path length being equal for all transmission light valves, and each of said transmission light valves being disposed at a second path length from the projection subsystem, said second path length being equal for all transmission light valves.

13. A projection TV system according to claim 12, wherein said light valves in said modulation subsystem include three transmission liquid crystal displays, a first of said liquid crystal displays modulating red light, a second of said liquid crystal displays modulating green light, and a third of said liquid crystal displays modulating blue light.

14. A projection TV system according to claim 13, wherein said modulation subsystem further includes a series of dichroic filters and mirrors for passing light through a respective one of each of said three liquid crystal displays and for recombining each of said red light, said green light, and said blue light before said projection subsystem.

15. A projection TV system according to claim 13, wherein said illumination subsystem provides one of critical illumination, Kohler illumination, or a combination of critical illumination and Kohler illumination.

16. A projection TV system according to claim 13, wherein said illumination subsystem includes a light source, at least one reflector means for collecting light not passing to said modulation subsystem, and a condenser lens system for passing light to said modulation subsystem, said at least one reflector means redirecting said light not originally passing to said modulation subsystem to said condenser lens system.

17. A projection TV system comprising an illumination subsystem providing a single illuminating beam, a modulation subsystem, and a projection subsystem, wherein said modulation subsystem includes at least two transmission light valves, each of said transmission light valves directly passing at least a portion of said single illuminating beam to said projection subsystem, each of said transmission light valves being disposed at a first path length from the illumination substage, said first path length being equal for all transmission light valves, and each of said transmission light valves being disposed at a second path length from the projection subsystem, said second path length being equal for all transmission light valves, wherein said light valves in said modulation subsystem include three transmission liquid crystal displays, a first of said liquid crystal displays modulating red light, a second of said liquid crystal displays modulating green light, and a third of said liquid crystal displays modulating blue light, wherein said illumination subsystem includes a light source, at least one reflector means for collecting light not passing to said modulation subsystem, and a condenser lens system for passing light to said modulation subsystem, said at least one reflector means redirecting said light not originally passing to said modulation subsystem to said condenser lens system, wherein said light source includes an inner and an outer envelope with plane mirrors within said outer envelope to direct reflected light to at least one image position adjacent said light source, and wherein said reflector means includes reflectors to collect and redirect light to at least one of said light source or said image position for passage through said condenser lens system.

18. A projection TV system comprising an illumination subsystem providing a single illuminating beam, a modulation subsystem, and a projection subsystem, wherein said modulation subsystem includes at least two transmission light valves, each of said transmission light valves directly passing at least a portion of said single illuminating beam to said projection subsystem, each of said transmission light valves being disposed at a first path length from the illumination substage, said first path length being equal for all transmission light valves, and each of said transmission light valves being disposed at a second path length from the projection subsystem, said second path length being equal for all transmission light valves, wherein said light valves in said modulation subsystem include three transmission liquid crystal displays, a first of said liquid crystal displays modulating red light, a second of said liquid crystal displays modulating green light, and a third of said liquid crystal displays modulating blue light, wherein said illumination subsystem includes a light source, at least one reflector means for collecting light not passing to said modulation subsystem, and a condenser lens system for passing light to said modulation subsystem, said at least one reflector means redirecting said light not originally passing to said modulation subsystem to said condenser lens system, wherein said light source directs light radially in all directions including through said condenser lens system, and wherein said reflector means are provided to redirect light not previously passing through said condenser lens system in a direction for passing through said condenser lens system.

19. A projection TV system comprising an illumination subsystem providing a single illuminating beam, a modulation subsystem, and a projection subsystem, wherein said modulation subsystem includes at least two transmission light valves, each of said transmission light valves directly passing at least a portion of said single illuminating beam to said projection subsystem, each of said transmission light valves being disposed at a first path length from the illumination substage, said first path length being equal for all transmission light valves, and each of said transmission light valves being disposed at a second path length from the projection subsystem, said second path length being equal for all transmission light valves, wherein said light valves in said modulation subsystem include three transmission liquid crystal displays, a first of said liquid crystal displays modulating red light, a second of said liquid crystal displays modulating green light, and a third of said liquid crystal displays modulating blue light, wherein said illumination subsystem includes a light source, at least one reflector means for collecting light not passing to said modulation subsystem, and a condenser lens system for passing light to said modulation subsystem, said at least one reflector means redirecting said light not originally passing to said modulation subsystem to said condenser lens system, wherein said light source provides randomly polarized light, and wherein a polarizing beamsplitter and at least one quarterwave plate are provided for directing a desired polarization of said polarized light to said modulation subsystem.

20. A display system comprising an illumination subsystem providing a single illuminating beam, a modulation subsystem, and a projection subsystem, wherein said modulation subsystem includes at least two transmission light valves, each of said transmission light valves directly passing at least a portion of said single illuminating beam to said projection subsystem, each of said transmission light valves being disposed at a first path length path from the illumination substage, said first path length being equal for all transmission light valves, and each of said transmission light valves being disposed at a second path length from the projection subsystem, said second path length being equal for all transmission light valves, wherein said light valves in said modulation subsystem include three transmission liquid crystal displays, a first of said liquid crystal displays modulating red light, a second of said liquid crystal displays modulating green light, and a third of said liquid crystal displays modulating blue light, wherein said illumination subsystem includes a light source, at least one reflector means for collecting light not passing to said modulation subyetem, and a condenser lens system for passing light to said modulation subsystem, said at least one reflector means redirecting said light not originally passing to said modulation subsystem to said condenser lens system, wherein said light source has only one envelope with plane mirrors being inside or outside said envelope to direct reflected light to at least one image position adjacent said light source, and wherein said reflector means includes reflectors to collect and redirect light to at least one of said light source or said image position for passage through said condenser lens system.

21. A projection TV system comprising an illumination subsystem providing a single illuminating beam, a modulation subsystem, and a projection subsystem, wherein said modulation subsystem includes at least two transmission light valves, each of said transmission light valves directly passing at least a portion of said single illuminating beam to said projection subsystem, each of said transmission light valves being disposed at a first path length from the illumination substage, said first path length being equal for all transmission light valves, and each of said transmission light valves being disposed at a second path length from the projection subsystem, said second path length being equal for all transmission light valves, wherein said light valves in said modulation subsystem include three transmission liquid crystal displays, a first of said liquid crystal displays modulating red light, a second of said liquid crystal displays modulating green light, and a third of said liquid crystal displays modulating blue light, wherein said illumination subsystem includes at least one metal halide lamp or at least one xenon arc lamp.

22. A projection TV system according to claim 21, wherein said illumination subsystem has at least two elongated lamps provided side by side.

23. A projection TV system according to claim 21, wherein said illumination subsystem has a single lamp with at least two elongated arcs provided side by side.

24. A display device comprising an illumination subsystem providing a single illuminating beam, a modulation subsystem, and a projection subsystem, said modulation subsystem including at least two transmission light valves, each of said transmission light valves directly passing at least a portion of said single illuminating beam to said projection subsystem, each of said transmission light valves being disposed at a first path length from the illumination substage, said first path length being equal for all transmission light valves, and each of said transmission light valves being disposed at a second path length from the projection subsystem, said second path length being equal for all transmission light valves, wherein an incandescent light source is provided in said illumination subsystem to supply initial illumination until an arc lamp light source can supply sufficient illumination.

25. A projection video system according to claim 24.

26. A display system comprising an illumination subsystem providing a single illuminating beam, a modulation subsystem, and a projection subsystem, wherein said modulation subsystem includes at least two transmission light valves, each of said transmission light valves directly passing at least a portion of said single illuminating beam to said projection subsystem, each of said transmission light valves being disposed a first path length from said illumination subsystem, said first path length being equal for all transmission light valves, and each of said transmission light valves being disposed at a second path length from said projection subsystem, said second path length being equal for all transmission light valves, wherein said light valves in said modulation subsystem include three transmission liquid crystal displays, a first of said liquid crystal displays modulating red light, a second of said liquid crystal displays modulating green light, and a third of said liquid crystal displays modulating blue light, wherein said modulation subsystem further includes a series of dichroic filters and mirrors for passing light through a respective one of said three liquid crystal displays and for recombining each of said red light, said green light, and said blue light before said projection subsystem, and wherein entrance and exit locations of said illumination subsystem and said projection subsystem are changed relative to said modulation subsystem.

27. A display system according to claim 26, wherein said dichroic filters and mirrors at one side of said modulation subsystem are arranged in parallel rows to said dichroic filters and mirrors at another side of said modulation subsystem, said first, second and third liquid crystal displays being individually arranged between said parallel rows of dichroic filters and mirrors.

28. A display system according to claim 26, wherein said dichroic filters and mirrors are arranged at Brewster's angle to the path of light in said modulation subsystem, and wherein said first, second and third liquid crystal displays are perpendicular to the path of said light.

29. A display system according to claim 26, wherein said illumination subsystem includes an elongated light source having a length in the range of 0.3 to 1.5 inches.

30. A display system according to claim 29, wherein said elongated light source has a length of at most about 1.06 inches.

31. A display system comprising an illumination subsystem providing a single illuminating beam, a modulation subsystem, and a projection subsystem, wherein said modulation subsystem includes at least two transmission light valves, each of said transmission light valves directly passing at least a portion of said single illuminating beam to said projection subsystem, each of said transmission light valves being disposed at a first path length from said illumination subsystem, said first path length being equal for all transmission light valves, and each of said transmission light valves being disposed at a second path length from said projection subsystem, said second path length being equal for all transmission light valves, wherein said light valves in said modulation subsystem include three transmission liquid crystal displays, a first of said liquid crystal displays modulating red light, a second of said liquid crystal displays modulating green light, and a third of said liquid crystals displays modulating blue light, wherein said modulation subsystem further includes a series of dichroic filters and mirrors for passing light through a respective one of said three liquid crystal displays and for recombining each of said red light, said green light, and said blue light before said projection subsystem, and wherein lens portions of said projection subsystem are disposed in said modulation subsystem, said lens portions being color corrected for said liquid crystal displays.

32. A display system according to claim 31, wherein two separate lens portions are provided relative to a respective liquid crystal display.

33. A display system according to claim 31, wherein said illumination subsystem includes an elongated light source having a length in the range of 0.3 to 1.5 inches.

34. A display system according to claim 33, wherein said elongated light source has a length of at most about 1.06 inches.

35. A display system comprising an illumination subsystem providing a single illuminating beam, a modulation subsystem, and a projection subsystem, wherein said modulation subsystem includes at least two transmission light valves, each of said transmission light valves directly passing at least a portion of said single illuminating beam to said projection subsystem, each of said transmission light valves being disposed at a first path length from said illumination subsystem, said first path length being equal for all transmission light valves, and each of said transmission light valves being disposed at a second path length from said projection subsystem, said second path length being equal for all transmission light valves, wherein said light valves in said modulation subsystem include three transmission liquid crystal displays, a first of said liquid crystal displays modulating red light, a second of said liquid crystal displays modulating green light, and a third of said liquid crystal displays modulating blue light, wherein said modulation subsystem further includes a series of dichroic filters and mirrors for passing light through a respective one of said three liquid crystal displays and for recombining each of said red light, said green light, and said blue light before said projection subsystem, and wherein at least one further dichroic filter is disposed in said modulation subsystem, said further filter being rotatable to vary wavelengths of said light passed by said liquid crystal displays.

36. A display system comprising an illumination subsystem providing a single illuminating beam, a modulation subsystem, and a projection subsystem, wherein said modulation subsystem includes at least two transmission light valves, each of said transmission light valves directly passing at least a portion of said single illumination beam to said projection subsystem, each of said transmission light valves being disposed at first path length from said illumination subsystem, said first path length being equal for all transmission light valves, and each of said transmission light valves being disposed at a second path length from said projection subsystem, said second path length being equal for all transmission light valves, wherein said light valves in said modulation subsystem include three transmission liquid crystal displays, a first of said liquid crystal displays modulating red light, a second of said liquid crystal displays modulating green light, and a third of said liquid crystal displays modulating blue light, and wherein each of said liquid crystal displays is disposed at a tilt from a direction of light travel.

37. A display system according to claim 36, wherein said elongated light source has a length of at most about 1.06 inches.

38. A display system comprising an illumination subsystem providing a single illuminating beam, a modulation subsystem, and a projection subsystem, wherein said modulation subsystem includes at least two transmission light valves, each of said transmission light valves directly passing at least a portion of said single illumination beam to said projection subsystem, each of said transmission light valves being disposed at first path length from said illumination subsystem, said first path length being equal for all transmission light valves, and each of said transmission light valves being disposed at a second path length from said projection subsystem, said second path length being equal for all transmission light valves, wherein said light valves in said modulation subsystem include three transmission liquid crystal displays, a first of said liquid crystal displays modulating red light, a second of said liquid crystal displays modulating green light, and a third of said liquid crystal displays modulating blue light, and wherein each of said liquid crystal displays is disposed at a tilt from a direction of light travel.

39. A display system according to claim 38, wherein a prism is provided to eliminate trapezoidal distortion of an image of said liquid crystal display.

40. A display system according to claim 39, wherein said prism is located adjacent said liquid crystal display, said prism having an angle B given by $$B = \frac{A}{(N-1)}$$

where A is the angle of tilt of said liquid crystal display and N is the refractive index of said prism.

41. A display system according to claim 39, wherein said prism is located adjacent an image of said liquid crystal display, said prism having an angle B given by $$B = \frac{A}{M(N-1)}$$

where A is the angle of tilt of said liquid crystal display, N is the refractive index of said prism, and M is the magnification of said image.

42. A display system according to claim 38, wherein said illumination subsystem includes an elongated light source having a length in the range of 0.3 to 1.5 inches.

43. A display system according to claim 42, wherein said elongated light source has a length of at most about 1.06 inches.

44. A display system comprising an illumination subsystem providing a single illuminating beam, a modulation subsystem, and a projection subsystem, wherein said modulation subsystem includes at least two transmission light valves, each of said transmission light valves directly passing at least a portion of said single illuminating beam to said projection subsystem, each of said transmission light valves being disposed at a first path length from said illumination subsystem, said first path length being equal for all transmission light valves, and each of said transmission light valves being disposed at a second path length from said projection subsystem, said second path length being equal for all transmission light valves, wherein said light valves in said modulation subsystem include three transmission liquid crystal displays, a first of said liquid crystal displays modulating red light, a second of said liquid crystal displays modulating green light, and a third of said liquid crystal displays modulating blue light, wherein said illumination subsystem includes a light source, at least one reflector means for collecting light not passing to said modulation subsystem, and a condenser lens system for passing light to said modulation subsystem, said at least one reflector means redirecting said light not previously passing to said modulation subsystem to said condenser lens system, wherein said light source includes an inner and an outer envelope with plane mirrors within said outer envelope to direct reflected light to at least one image position adjacent said light source, and wherein said reflector means includes reflectors to collect and redirect light to at least one of said light source or said image position for passage through said condenser lens system.

45. A display system according to claim 44, wherein said illumination subsystem includes an elongated light source having a length in the range of 0.3 to 1.5 inches.

46. A display system according to claim 45, wherein said elongated light source has a length of at most about 1.06 inches.

47. A display system comprising an illumination subsystem providing a single illumination beam, a modulation subsystem, and a projection subsystem, wherein said modulation subsystem includes at least two transmission light valves, each of said transmission light valves directly passing at least a portion of said single illuminating beam to said projection subsystem, each of said transmission light valves being disposed at a first path length from said illumination subsystem, said first path length being equal for all transmission light valves, and each of said transmission light valves being disposed at a second path length from said projection subsystem, said second path length being equal for all transmission light valves, wherein said light valves in said modulation subsystem include three transmission liquid crystal displays, a first of said liquid crystal displays modulating red light, a second of said liquid crystal displays modulating green light, and a third of said liquid crystal displays modulating blue light, wherein said illumination subsystem includes a light source, at least one reflector means for collecting light not passing to said modulation subsystem, and a condenser lens system for passing light to said modulation subsystem, said at least one reflector means redirecting said light not previously passing to said modulation subsystem to said condenser lens system, wherein said light source directs light radially in all directions including through said condenser lens system, and wherein said reflector means are provided to redirect light not originally passing through said condenser lens system in a direction for passing through said condenser lens system.

48. A display system according to claim 47, wherein said illumination subsystem includes an elongated light source having a length in the range of 0.3 to 1.5 inches.

49. A display system according to claim 48, wherein said elongated light source has a length of at most about 1.06 inches.

50. A display system comprising an illumination subsystem providing a single illuminating beam, a modulation subsystem, and a projection subsystem, wherein said modulation subsystem includes at least two transmission light valves, each of said transmission light valves directly passing at least a portion of said single illuminating beam to said projection subsystem, each of said transmission light valves being disposed at a first path length from said illumination subsystem, said first path length being equal for all transmission light valves, and each of said transmission light valves being disposed at a second path length from said projection subsystem, said second path length being equal for all transmission light valves, wherein said light valves in said modulation subsystem include three transmission liquid crystal displays, a first of said liquid crystal displays modulating red light, a second of said liquid crystal displays modulating green light, and a third of said liquid crystal displays modulating blue light, wherein said illumination subsystem includes a light source, at least one reflector means for collecting light not passing to said modulation subsystem, and a condenser lens system for passing light to said modulation subsystem, said at least one reflector means redirecting said light not previously passing to said modulation subsystem to said condenser lens system, wherein said light source provides randomly polarized light, and wherein a polarizing beamsplitter and at least one quarterwave plate are provided for directing a desired polarization of said polarized light to said modulation subsystem.

51. A display system according to claim 50, wherein said illumination subsystem includes an elongated light source having a length in the range of 0.3 to 1.5 inches.

52. A display system according to claim 51, wherein said elongated light source has a length of at most about 1.06 inches.

53. A display system comprising an illumination subsystem providing a single illuminating beam, a modulation subsystem, and a projection subsystem, wherein said modulation subsystem includes at least two transmission light valves, each of said transmission light valves directly passing at least a portion of said single illuminating beam to said projection subsystem, each of said transmission light valves being disposed at a first path length from said illumination subsystem, said first path length being equal for all transmission light valves, and each of said transmission light valves being disposed at a second path length from said projection subsystem, said second path length being equal for all transmission light valves, wherein said light valves in said modulation subsystem include three transmission liquid crystal displays, a first of said liquid crystal displays modulating red light, a second of said liquid crystal displays modulating green light, and a third of said liquid crystal displays modulating blue light, and wherein said illumination subsystem includes at least one metal halide lamp or at least one xenon arc lamp.

54. A display system according to claim 53, wherein said illumination subsystem has at least two elongated lamps provided side by side.

55. A display system according to claim 53, wherein said illumination subsystem has a single lamp with at least two elongated arcs provided side by side.

56. A display system according to claim 53, wherein said illumination subsystem includes an elongated light source having a length in the range of 0.3 to 1.5 inches.

57. A display system according to claim 56, wherein said elongated light source has a length of at most about 1.06 inches.

58. A display system comprising an illumination subsystem providing a single illuminating beam, a modulation subsystem, and a projection subsystem, wherein said modulation subsystem includes at least two transmission light valves, each of said transmission light valves directly passing at least a portion of said single illuminating beam to said projection subsystem, each of said transmission light valves being disposed at a first path length from said illumination subsystem, said first path length being equal for all transmission light valves, and each of said transmission light valves being disposed at a second path length from said projection subsystem, said second path length being equal for all transmission light valves, and wherein each of said light valves is disposed at a tilt from a direction of light travel.

59. A display system according to claim 58, wherein a prism is provided to eliminate trapezoidal distortion of an image of said light valves.

60. A display system according to claim 59, wherein said prism is located adjacent said light valves, said prism having an angle B given by $$B = \frac{A}{(N-1)}$$

where A is the angle of tilt of said light valves and N is the refractive index of said prism.

61. A display system according to claim 59, wherein said prism is located adjacent an image of said light valves, said prism having an angle B given by $$B = \frac{A}{M(N-1)}$$

where A is the angle of tilt of said light valves, N is the refractive index of said prism, and M is the magnification of said image.

62. A display system according to claim 58, wherein at least three light valves are included in said modulation subsystem.

63. A display system comprising an illumination subsystem providing a single illuminating beam, a modulation subsystem, and a projection subsystem, wherein said modulation subsystem includes at least two transmission light valves, each of said transmission light valves directly passing at least a portion of said single illuminating beam to said projection subsystem, each of said transmission light valves being disposed at a first path length from said illumination subsystem, said first path length being equal for all transmission light valves, and each of said transmission light valves being disposed at a second path length from said projection subsystem, said second path length being equal for all transmission light valves, and wherein said illumination subsystem includes a light source, at least one reflector means for collecting light not passing to said modulation subsystem, and a condenser lens system for passing light to said modulation subsystem, said at least one reflector means redirecting said light not previously passing to said modulation subsystem to said condenser lens system.

64. A display system according to claim 63, wherein said light source includes an inner and an outer envelope with plane mirrors within said outer envelope to direct reflected light to at least one image position adjacent said light source, and wherein said reflector means includes reflectors to collect and redirect light to at least one of said light source or said image position for passage through said condenser lens system.

65. A display system according to claim 63, wherein said light source directs light radially in substantially all directions including through said condenser lens system, and wherein said reflector means are provided to redirect light not previously passing through said condenser lens system in a direction for passing through said condenser lens system.

66. A display system according to claim 63, wherein said light source has only one envelope with plane mirrors being inside or outside said envelope to direct reflected light to at least one image position adjacent said light source, and wherein said reflector means includes reflectors to collect and redirect light to at least one of said light source or said image position for passage through said condenser lens system.

67. A display system according to claim 63, wherein at least three light valves are included in said modulation subsystem.

68. A display system comprising an illumination subsystem providing a single illuminating beam, a modulation subsystem, and a projection subsystem, wherein said modulation subsytem includes at least two transmission light valves, each of said transmission light valves directly passing at least a portion of said single illuminating beam to said projection subsystem, each of said transmission light valves being disposed at a first path length from said illumination subsystem, said first path length being equal for all transmission light valves, and each of said transmission light valves being disposed at a second path length from said projection subsystem, said second path length being equal for all transmission light valves, wherein said illumination subsystem includes a light source, at least one reflector means for collecting light not passing to said modulation subsystem, and a condenser lens system for passing light to said modulation subsystem, said at least one reflector means redirecting said light not previously passing to said modulation subsystem to said condenser lens system, wherein said light source provides randomly polarized light, and wherein a polarizing beamsplitter and at least one quarterwave plate are provided for directing a desired polarization of said polarized light to said modulation subsystem.

69. A display system comprising an illumination subsystem providing a single illuminating beam, a modulation subsystem, and a projection subsystem, wherein said modulation subsystem includes at least two transmission light valves, each of said transmission light valves directly passing at least a portion of said single illuminating beam to said projection subsystem, each of said transmission light valves being disposed at a first path length from said illumination subsystem, said first path length being equal for all transmission light valves, and each of said transmission light valves being disposed at a second path length from said projection subsystem, said second path length being equal for all transmission light valves, and wherein said illumination subsystem includes at least one metal halide lamp or at least one xenon arc lamp.

70. A display system according to claim 69, wherein at least three light valves are included in said modulation subsystem.

71. A display system comprising an illumination subsystem providing a single illuminating beam, a modulation subsystem, and a projection subsystem, wherein said modulation subsystem includes at least two transmission light valves, each of said transmission light values directly passing at least a portion of said single illuminating beam to said projection subsystem, each of said transmission light valves being disposed at a first path length from said illumination subsystem, said first path length being equal for all transmission light valves, and each of said transmission light valves being disposed at a second path length from said projection subsystem, said second path length being equal for all transmission light valves, and wherein said illumination subsystem has at least two elongated lamps provided side by side.

72. A display system according to claim 71, wherein at least three light valves are included in said modulation subsystem.

73. A projection TV system comprising an illumination subsystem providing a single illuminating beam, a modulation subsystem, and a projection subsystem, wherein said modulation subsystem includes at least two transmission light valves, each of said transmission light valves directly passing a least a portion of said single illuminating beam to said projection subsystem, each of said transmission light valves being disposed at a first path length from the illumination substage, said first path length being equal for all transmission light valves, and each of said transmission light valves being disposed at a second path length from the projection subsystem, said second path length being equal for all transmission light valves, wherein said light valves in said modulation subsystem include three transmission liquid crystal displays, a first of said liquid crystal displays modulating red light, a second of said liquid crystal displays modulating green light, and a third of said liquid crystal displays modulating blue light, and wherein entrance and exit locations of said illumination subsystem and said projection subsystem are changed relative to said modulation subsystem.

74. A projection TV system according to claim 73, wherein said dichroic filters and mirrors at one side of said modulation subsystem are arranged in parallel rows to said dichroic filters and mirrors at another side of said modulation subsystem, said first, second and third liquid crystal displays being individually arranged between said parallel rows of dichroic filters and mirrors.

75. A projection TV system according to claim 73, wherein said dichroic filters and mirrors are arranged at Brewster's angle to the path of light in said modulation subsystem, and wherein said first, second and third liquid crystal displays are perpendicular to the path of said light.

76. A projection TV system comprising an illumination subsystem providing a single illuminating beam, a modulation subsystem, and a projection subsystem, wherein said modulation subsystem includes at least two transmission light valves, each of said transmission light valves directly passing at least a portion of said single illuminating beam, each of said transmission light valves being disposed at a first path length from the illumination substage, said first path length being equal for all transmission light valves, and each of said transmission light valves being disposed at a second path length from the projection subsystem, said second path length being equal for all transmission light valves, wherein said light valves in said modulation subsystem include three transmission liquid crystal displays, a first of said liquid crystal displays modulating red light, a second of said liquid crystal displays modulating green light, and a third of said liquid crystal displays modulating blue light, wherein said modulation subsystem further includes a series of dichroic filters and mirrors for passing light through a respective one of each of said three liquid crystal displays and for recombining each of said red light, said green light, and said blue light before said projection subsystem, and wherein lens portions of said projection subsystem are disposed in said modulation subsystem, said lens portions being color corrected for said liquid crystal displays.

77. A projection TV system according to claim 76, wherein a separate lens portion is provided relative to two different liquid crystal displays.

78. A projection TV system comprising an illumination subsystem providing a single illuminating beam, a modulation subsystem, and a projection subsystem, wherein said modulation subsystem includes at least two transmission light valves, each of said transmission light valves directly passing at least a portion of said single illuminating beam to said projection subsystem, each of said transmission light valves being disposed at a first path length from the illumination substage, said first path length being equal for all transmission light valves, and each of said transmission light valves being disposed at a second path length from the projection subsystem, said second path length being equal for all transmission light valves, wherein said light valves in said modulation subsystem include three transmission liquid crystal displays, a first of said liquid crystal displays modulating red light, a second of said liquid crystal displays modulating green light, and a third of said liquid crystal displays modulating blue light, wherein said modulation subsystem further includes a series of dichroic filters and mirrors for passing light through a respective one of each of said three liquid crystal displays and for recombining each of said red light, said green light, and said blue light before said projection subsystem, and wherein at least one further dichroic filter is disposed in said modulation subsystem, said further filter being rotatable to vary wavelengths of said light passed by said liquid crystal displays.

79. A projection TV system comprising an illumination subsystem providing a single illuminating beam, a modulation subsystem, and a projection subsystem, wherein said modulation subsystem includes at least two transmission light valves, each of said transmission light valves directly passing at least a portion of said single illuminating beam to said projection subsystem, each of said transmission light valves being disposed at a first path length from the illumination substage, said first path length being equal for all transmission light valves, and each of said transmission light valves being disposed at a second path length from the projection subsystem, said second path length being equal for all transmission light valves, wherein said light valves in said modulation subsystem include three transmission liquid crystal displays, a first of said liquid crystal displays modulating red light, a second of said liquid crystal displays modulating green light, and a third of said liquid crystal displays modulating blue light, and wherein each of said liquid crystal displays is disposed at a tilt from a direction of light travel.

80. A projection TV system according to claim 79, wherein a prism is provided to eliminate trapezoidal distortion of an image of said liquid crystal display.

81. A projection TV system according to claim 80, wherein said prism is located adjacent said liquid crystal display, said prism having an angle B given by $$B = \frac{A}{(N-1)}$$

where A is the angle of tilt of said liquid crystal display and N is the refractive index of said prism.

82. A projection TV system according to claim 80, wherein said prism is located adjacent an image of said liquid crystal display, said prism having an angle B given by $$B = \frac{A}{M(N-1)}$$

were A is the angle of tilt of said liquid crystal display, N is the refractive index of said prism, and M is the magnification of said image.

* * * * *

REEXAMINATION CERTIFICATE (1393rd)
United States Patent [19]
McKechnie et al.

[11] B1 4,864,390
[45] Certificate Issued  Dec. 11, 1990

[54] DISPLAY SYSTEM WITH EQUAL PATH LENGTHS

[75] Inventors: Thomas S. McKechnie, Ossining; Jill F. Goldenberg, Pelham Manor; Joshua D. Eskin, New York; Jeffrey A. Shimizu, Mt. Kisco, all of N.Y.; Ralph H. Bradley, Jr.; William F. Guerinot, both of Knoxville, Tenn.

[73] Assignee: North American Philips Corporation

Reexamination Request:
No. 90/001,982, Apr. 4, 1990

Reexamination Certificate for:
Patent No.: 4,864,390
Issued: Sep. 5, 1989
Appl. No.: 292,618
Filed: Dec. 29, 1988

[51] Int. Cl.$^5$ .......................... H04N 9/30; H04N 9/31
[52] U.S. Cl. .......................................... 358/60; 358/61; 340/784; 350/345; 353/34
[58] Field of Search ................ 358/61, 62, 232, 233, 358/236; 340/784; 350/330, 337, 338, 345, 347 E, 400, 401, 403, 408; 353/31, 34

[56] References Cited

U.S. PATENT DOCUMENTS

| | | | |
|---|---|---|---|
| 4,127,332 | 11/1978 | Jacobson et al. | 358/236 X |
| 4,191,456 | 3/1980 | Hong et al. | 358/61 |
| 4,305,099 | 1/1984 | Gagnon et al. | 350/337 |
| 4,425,028 | 12/1981 | True et al. | 358/60 |
| 4,435,732 | 3/1984 | Hyatt | 358/254 |
| 4,461,542 | 7/1984 | Gagnon | 353/31 |
| 4,464,019 | 8/1984 | Gagnon | 350/331 R |
| 4,544,237 | 10/1984 | Gagnon | 350/331 R |
| 4,562,478 | 12/1985 | Hirosawa et al. | 358/236 |
| 4,642,740 | 2/1987 | True | 358/233 |
| 4,739,396 | 4/1988 | Hyatt | 358/60 |

FOREIGN PATENT DOCUMENTS

61-102892 5/1986 Japan.
61-102893 5/1986 Japan.
61-113885 6/1986 Japan.

*Primary Examiner*—James J. Groody

[57] ABSTRACT

Display systems useful for projection video and television systems are provided to perform with high efficiency and good color rendition. In these systems, color may be provided, as one example, by various light valves, such as liquid crystal displays. Each of the liquid crystal displays are positioned at equal path distances from an illuminating subsystem, and have equal path distances from the light valves to a projection subsystem. This enables optimum illumination of each of the light valves. Various embodiments of arranging the light valves, as well as providing illumination are described.

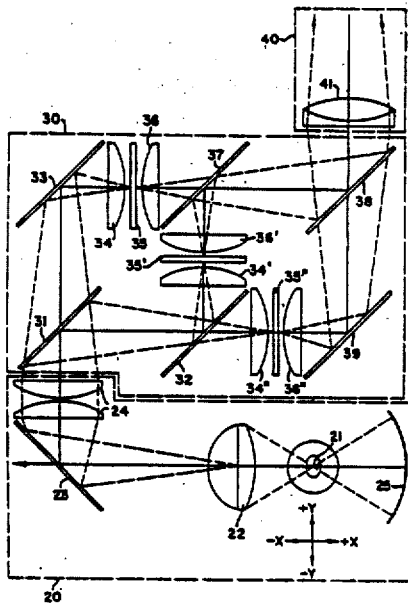

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–25, 31–37, 39–72 and 76–82 is confirmed.

Claims 27, 38 and 74 are cancelled.

Claims 26 and 73 are determined to be patentable as amended.

Claims 28–30 and 75, dependent on an amended claim, are determined to be patentable.

26. A display system comprising an illumination subsystem providing a single illuminating beam, a modulation subsystem, and a projection subsystem, wherein said modulation subsystem includes at least two transmission light valves, each of said transmission light valves directly passing at least a portion of said single illuminating beam to said projection subsystem, each of said transmission light valves being disposed a first path length from said illumination subsystem, said first path length being equal for all transmission light valves, and each of said transmission light valves being disposed at a second [path] length from said projection subsystem, said second path length being equal for all transmission light valves, wherein said light valves in said modulation subsystem include three transmission liquid crystal displays, a first of said liquid crystal displays modulating red light, a second of said liquid crystal displays modulating green light, and a third of said liquid crystal displays modulating blue light, wherein said modulation subsystem further includes a series of dichroic filters and mirrors for passing light through a respective one of said three liquid crystal displays and for recombining each of said red light, said green light, and said blue light before said projection subsystem, and wherein [entrance and exit locations of said illumination subsystem and said projection subsystem are changed relative to said modulation subsystem] *said dichroic filters and mirror at one side of said modulation subsystem are arranged in parallel rows to said dichroic filters and mirrors at another side of said modulation subsystem, said first, second and third liquid crystal displays being individually arranged between said parallel rows of dichroic filters and mirrors.*

73. A projection TV system comprising an illumination subsystem providing a single illuminating beam, a modulation subsystem, and a projection subsystem, wherein said modulation subsystem includes at least two transmission light valves, each of said transmission light valves directly passing [a] *at* least a portion of said single illuminating beam to said projection subsystem, each of said transmission light valves being disposed at a first path length from the illumination substage, said first path length being equal for all transmission light valves, and each of said transmission light valves being disposed at a second path length from the projection subsystem, said second path length being equal for all transmission light valves, wherein said light valves in said modulation subsystem include three transmission liquid crystal displays, a first of said liquid crystal displays modulating red light, a second of said liquid crystal displays modulating green light, and a third of said liquid crystal displays modulating blue light, and wherein [entrance and exit locations of said illumination subsystem and said projection subsystem are changed relative to said modulation subsystem] *said dichroic filters and mirrors at one side of said modulation subsystem are arranged in parallel rows to said dichroic filters and mirrors at another side of said modulation subsystem, said first, second and third liquid crystal displays being individually arranged between said parallel rows of dichroic filters and mirrors.*

* * * * *